US012488408B2

(12) United States Patent
Stumpf et al.

(10) Patent No.: US 12,488,408 B2
(45) Date of Patent: *Dec. 2, 2025

(54) NETWORK SYSTEM TO FILTER REQUESTS BY DESTINATION AND DEADLINE

(71) Applicant: Uber Technologies, Inc., San Francisco, CA (US)

(72) Inventors: Kevin Stumpf, San Francisco, CA (US); Manas Khadilkar, San Francisco, CA (US); Maya Paritosh Choksi, San Francisco, CA (US); Maxim Gurevich, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 18/116,803

(22) Filed: Mar. 2, 2023

(65) Prior Publication Data
US 2023/0206375 A1 Jun. 29, 2023

Related U.S. Application Data

(63) Continuation of application No. 17/188,898, filed on Mar. 1, 2021, now Pat. No. 11,599,964, which is a (Continued)

(51) Int. Cl.
G06Q 50/30 (2012.01)
G06Q 10/0631 (2023.01)
(Continued)

(52) U.S. Cl.
CPC ..... *G06Q 50/40* (2024.01); *G06Q 10/063114* (2013.01); *G06Q 10/08355* (2013.01); *G06Q 30/0284* (2013.01)

(58) Field of Classification Search
None
See application file for complete search history.

(56) References Cited

U.S. PATENT DOCUMENTS 4,023,753 A 5/1977 Dobler
5,604,676 A 2/1997 Penzias
(Continued)

FOREIGN PATENT DOCUMENTS

CA 2889853 5/2014
CN 102495541 11/2012
(Continued)

OTHER PUBLICATIONS

Furuhata, M. et al.; Ridesharing: The State-of-the-Art and Future Directions; Apr. 15, 2013; Elsevier Ltd.; Transportation Research Part B 57 (2013); pp. 28-46 (Year: 2013).*

(Continued)

*Primary Examiner* — Beth V Boswell
*Assistant Examiner* — Ashley Y Young
(74) *Attorney, Agent, or Firm* — Mahamedi IP Law LLP

(57) ABSTRACT

A method and system for filtering service requests by destination and deadline are described. A network computer system receives provider data corresponding to a specified destination and a deadline from a service provider. The network computer system tracks a current location of the service provider through a device equipped with one or more location-based resources and receives request data corresponding to requests for service from users. The network computer system analyzes the request data for each of the requests for service to identify a subset of the requests that are assignable to the service provider based on whether the service provider is able to fulfill the request and travel to the desired destination before the deadline. The network computer system transmits a message to the service provider's (Continued)

device requesting that the service provider fulfill one of the requests for service from the identified subset.

17 Claims, 8 Drawing Sheets

Related U.S. Application Data continuation of application No. 15/866,284, filed on Jan. 9, 2018, now Pat. No. 10,937,115, which is a continuation of application No. 15/432,766, filed on Feb. 14, 2017, now Pat. No. 9,898,791.

(51) Int. Cl.
*G06Q 50/40* (2024.01)
*G06Q 10/0835* (2023.01)
*G06Q 30/0283* (2023.01)

(56) References Cited

U.S. PATENT DOCUMENTS

| | | |
|---|---|---|
| 5,880,958 A | 3/1999 | Helms |
| 5,945,919 A | 8/1999 | Trask |
| 5,953,706 A | 9/1999 | Patel |
| 6,212,393 B1 | 4/2001 | Suarez |
| 6,356,838 B1 | 3/2002 | Paul |
| 6,456,207 B1 | 9/2002 | Yen |
| 6,516,056 B1 | 2/2003 | Justice et al. |
| 6,608,566 B1 | 8/2003 | Davis |
| 6,756,913 B1 | 6/2004 | Ayed |
| 6,832,092 B1 | 12/2004 | Suarez |
| 7,080,019 B1 | 7/2006 | Hurzeler |
| 7,840,427 B2 | 11/2010 | O'Sullivan |
| 8,412,667 B2 | 4/2013 | Zhang |
| 8,554,608 B1 | 10/2013 | O'Connor |
| 8,954,094 B1 | 2/2015 | Mishra |
| 9,070,101 B2 | 6/2015 | Abhayanker |
| 9,534,912 B2 | 1/2017 | Lord |
| 9,911,170 B2 | 3/2018 | Kim |
| 9,939,279 B2 | 4/2018 | Pan |
| 10,074,065 B2 | 9/2018 | Jones |
| 10,152,053 B1 | 12/2018 | Smith |
| 10,178,890 B1 | 1/2019 | Andon |
| 10,197,410 B2 | 2/2019 | Guo |
| 10,282,681 B2 | 5/2019 | Wang |
| 10,458,801 B2 | 10/2019 | Lord |
| 10,572,964 B2 | 2/2020 | Kim |
| 11,099,019 B2 | 8/2021 | Nickels |
| 11,551,325 B2 | 1/2023 | Tolkin |
| 11,747,154 B2 | 9/2023 | Nickels |
| 2001/0037174 A1 | 11/2001 | Dickerson |
| 2001/0056363 A1 | 12/2001 | Gantz |
| 2002/0034292 A1 | 3/2002 | Tuoriniemi et al. |
| 2002/0194129 A1 | 12/2002 | Furuya et al. |
| 2003/0030666 A1 | 2/2003 | Najmi |
| 2003/0058082 A1 | 3/2003 | Mallick |
| 2004/0024789 A1 | 2/2004 | Ditcharo et al. |
| 2004/0049424 A1 | 3/2004 | Murray |
| 2004/0106399 A1 | 6/2004 | Ki |
| 2004/0107110 A1 | 6/2004 | Gottlieb et al. |
| 2004/0148347 A1 | 7/2004 | Appelman |
| 2004/0158483 A1 | 8/2004 | Lecouturier |
| 2004/0219933 A1 | 11/2004 | Faith |
| 2004/0225520 A1 | 11/2004 | Aoki et al. |
| 2004/0260470 A1 | 12/2004 | Rast |
| 2005/0227704 A1 | 10/2005 | Ferra |
| 2005/0251333 A1 | 11/2005 | Adamzyk |
| 2005/0278063 A1 | 12/2005 | Hersh |
| 2005/0278192 A1 | 12/2005 | Cantini et al. |
| 2006/0004590 A1 | 1/2006 | Khoo |
| 2006/0023569 A1 | 2/2006 | Agullo |
| 2006/0034201 A1 | 2/2006 | Umeda |
| 2006/0059023 A1 | 3/2006 | Mashinsky |
| 2006/0155460 A1 | 7/2006 | Raney |
| 2006/0200306 A1 | 9/2006 | Adamcyzk |
| 2006/0217885 A1 | 9/2006 | Crady et al. |
| 2006/0235739 A1 | 10/2006 | Levis |
| 2006/0293937 A1 | 12/2006 | Sohm |
| 2007/0130156 A1 | 6/2007 | Tenhunen |
| 2007/0167182 A1 | 7/2007 | Tenhunen |
| 2007/0255627 A1 | 11/2007 | Hallowell |
| 2007/0276595 A1 | 11/2007 | Lewinson |
| 2008/0033633 A1 | 2/2008 | Akiyoshi |
| 2008/0091342 A1 | 4/2008 | Assael |
| 2008/0177584 A1 | 7/2008 | Altaf et al. |
| 2008/0195428 A1 | 8/2008 | O'Sullivan |
| 2008/0208441 A1 | 8/2008 | Cheung |
| 2008/0270019 A1 | 10/2008 | Anderson |
| 2008/0270204 A1 | 10/2008 | Poykko |
| 2008/0277183 A1 | 11/2008 | Huang |
| 2009/0030885 A1 | 1/2009 | DePasquale |
| 2009/0083111 A1 | 3/2009 | Carr |
| 2009/0143965 A1 | 6/2009 | Chang et al. |
| 2009/0156241 A1 | 6/2009 | Staffaroni |
| 2009/0176508 A1 | 7/2009 | Lubeck et al. |
| 2009/0192851 A1 | 7/2009 | Bishop |
| 2009/0216600 A1 | 8/2009 | Hill |
| 2009/0248587 A1 | 10/2009 | Van Buskirk |
| 2009/0254270 A1 | 10/2009 | Yu |
| 2009/0326991 A1 | 12/2009 | Wei |
| 2010/0017275 A1 | 1/2010 | Carlson |
| 2010/0074383 A1 | 3/2010 | Lee |
| 2010/0153279 A1 | 6/2010 | Zahn |
| 2010/0211425 A1 | 8/2010 | Govindarajan |
| 2010/0211498 A1 | 8/2010 | Aabye et al. |
| 2011/0009098 A1 | 1/2011 | Kong |
| 2011/0099040 A1 | 4/2011 | Felt |
| 2011/0153495 A1 | 6/2011 | Dixon |
| 2011/0153628 A1 | 6/2011 | Lehmann |
| 2011/0225257 A1 | 9/2011 | Tilden et al. |
| 2011/0225269 A1 | 9/2011 | Yap et al. |
| 2011/0238755 A1 | 9/2011 | Khan |
| 2011/0243553 A1 | 10/2011 | Russell |
| 2011/0251951 A1 | 10/2011 | Kolkowitz et al. |
| 2011/0301985 A1 | 12/2011 | Camp et al. |
| 2012/0023294 A1 | 1/2012 | Resnick |
| 2012/0041675 A1 | 2/2012 | Juliver |
| 2012/0059693 A1 | 3/2012 | Colodny et al. |
| 2012/0072249 A1 | 3/2012 | Weir et al. |
| 2012/0078671 A1 | 3/2012 | Mohebbi |
| 2012/0078672 A1 | 3/2012 | Mohebbi |
| 2012/0203599 A1 | 8/2012 | Choi |
| 2012/0232943 A1 | 9/2012 | Myr |
| 2012/0265580 A1 | 10/2012 | Kobayashi |
| 2012/0290950 A1 | 11/2012 | Rapaport |
| 2013/0018795 A1 | 1/2013 | Kolhatkar et al. |
| 2013/0073327 A1 | 3/2013 | Edelberg |
| 2013/0102333 A1 | 4/2013 | Dam |
| 2013/0110392 A1 | 5/2013 | Kosseifi |
| 2013/0144831 A1 | 6/2013 | Atlas |
| 2013/0158861 A1 | 6/2013 | Lerenc |
| 2013/0179215 A1 | 7/2013 | Slinin |
| 2013/0215843 A1 | 8/2013 | Diachina |
| 2013/0268406 A1 | 10/2013 | Radhakrishnan |
| 2014/0025410 A1 | 1/2014 | Churchman et al. |
| 2014/0056526 A1 | 2/2014 | Scipioni |
| 2014/0067488 A1 | 3/2014 | James |
| 2014/0073300 A1 | 3/2014 | Leeder |
| 2014/0074536 A1 | 3/2014 | Meushar |
| 2014/0129302 A1 | 5/2014 | Amin et al. |
| 2014/0149157 A1 | 5/2014 | Shaam et al. |
| 2014/0149441 A1 | 5/2014 | Wang |
| 2014/0156556 A1 | 6/2014 | Lavian |
| 2014/0172727 A1 | 6/2014 | Abhyanker |
| 2014/0258894 A1 | 9/2014 | Brown |
| 2014/0279668 A1 | 9/2014 | Lievens |
| 2014/0378118 A1 | 12/2014 | Mohebbi |
| 2014/0378159 A1 | 12/2014 | Dolbakian |
| 2015/0032485 A1 | 1/2015 | Nelson |
| 2015/0046080 A1 | 2/2015 | Wesselius |
| 2015/0081362 A1 | 3/2015 | Chadwick |
| 2015/0161554 A1 | 6/2015 | Sweeney |
| 2015/0161563 A1 | 6/2015 | Mehrabi |

(56) References Cited

U.S. PATENT DOCUMENTS

| | | | |
|---|---|---|---|
| 2015/0161564 A1* | 6/2015 | Sweeney | G06Q 10/08355 705/338 |
| 2015/0161698 A1 | 6/2015 | Jones | |
| 2015/0176997 A1 | 6/2015 | Pursche | |
| 2015/0206267 A1* | 7/2015 | Khanna | G06Q 30/0629 705/417 |
| 2015/0262430 A1 | 9/2015 | Farrelly | |
| 2015/0317568 A1 | 11/2015 | Grasso | |
| 2015/0323327 A1 | 11/2015 | Lord | |
| 2015/0323331 A1 | 11/2015 | Lord | |
| 2015/0323335 A1 | 11/2015 | Lord | |
| 2015/0323336 A1 | 11/2015 | Lord | |
| 2015/0324717 A1 | 11/2015 | Lord | |
| 2015/0324718 A1 | 11/2015 | Lord | |
| 2015/0324729 A1 | 11/2015 | Lord | |
| 2015/0339923 A1 | 11/2015 | Konig | |
| 2015/0345951 A1 | 12/2015 | Dutta | |
| 2016/0019728 A1 | 1/2016 | Petrie | |
| 2016/0026936 A1 | 1/2016 | Richardson | |
| 2016/0027306 A1 | 1/2016 | Lambert | |
| 2016/0027307 A1 | 1/2016 | Abhyanker | |
| 2016/0034845 A1 | 2/2016 | Hiyama | |
| 2016/0066004 A1 | 3/2016 | Lieu | |
| 2016/0104122 A1 | 4/2016 | Gorlin | |
| 2016/0117610 A1 | 4/2016 | Ikeda | |
| 2016/0138928 A1 | 5/2016 | Guo | |
| 2016/0148167 A1 | 5/2016 | Li | |
| 2016/0180346 A1 | 6/2016 | Cheng | |
| 2016/0334232 A1 | 11/2016 | Zhuang | |
| 2016/0335568 A1 | 11/2016 | Bailey | |
| 2016/0356615 A1 | 12/2016 | Arata | |
| 2016/0364678 A1 | 12/2016 | Cao | |
| 2016/0364679 A1 | 12/2016 | Cao | |
| 2016/0364812 A1 | 12/2016 | Cao | |
| 2016/0364823 A1 | 12/2016 | Cao | |
| 2016/0364824 A1 | 12/2016 | Bryant | |
| 2017/0083832 A1 | 3/2017 | Williams | |
| 2017/0132540 A1 | 5/2017 | Haparnas | |
| 2017/0169366 A1 | 6/2017 | Klein | |
| 2017/0186126 A1 | 6/2017 | Marco | |
| 2017/0192437 A1 | 7/2017 | Bier | |
| 2017/0193404 A1 | 7/2017 | Yoo | |
| 2017/0220966 A1 | 8/2017 | Wang | |
| 2017/0293925 A1 | 10/2017 | Marueli | |
| 2017/0300848 A1 | 10/2017 | Shoval | |
| 2017/0308824 A1 | 10/2017 | Lord | |
| 2017/0351987 A1 | 12/2017 | Liu | |
| 2018/0005145 A1 | 1/2018 | Lo | |
| 2018/0032928 A1 | 2/2018 | Li | |
| 2018/0060838 A1 | 3/2018 | Agrawal | |
| 2018/0091604 A1 | 3/2018 | Yamashita | |
| 2018/0101925 A1 | 4/2018 | Brinig | |
| 2018/0102017 A1 | 4/2018 | Brinig | |
| 2018/0189717 A1 | 7/2018 | Cao | |
| 2018/0211351 A1 | 7/2018 | Kim | |
| 2018/0268329 A1 | 9/2018 | Lord | |
| 2018/0339714 A1 | 11/2018 | Smid | |
| 2018/0356239 A1 | 12/2018 | Marco | |
| 2019/0095849 A1 | 3/2019 | Sweeney | |
| 2019/0178656 A1 | 6/2019 | Stegall | |
| 2019/0244318 A1 | 8/2019 | Rajcok | |
| 2019/0265703 A1 | 8/2019 | Hicok | |
| 2019/0340554 A1 | 11/2019 | Jaffe | |
| 2019/0347754 A1 | 11/2019 | Dicker | |
| 2019/0392368 A1 | 12/2019 | Raghunathan | |
| 2020/0175429 A1 | 6/2020 | Beaurepaire | |
| 2020/0211070 A1 | 7/2020 | Singh | |
| 2020/0250196 A1 | 8/2020 | Goldstein | |
| 2020/0258344 A1 | 8/2020 | Brinig | |
| 2020/0272954 A1 | 8/2020 | Serra | |
| 2021/0097452 A1 | 4/2021 | Niemiec | |
| 2021/0121446 A1 | 4/2021 | Desai | |
| 2021/0152652 A1 | 5/2021 | Barreto | |
| 2021/0256649 A1 | 8/2021 | Stumpf | |
| 2021/0319380 A1 | 10/2021 | Camp | |
| 2021/0407032 A1 | 12/2021 | Kim | |
| 2022/0215499 A1 | 7/2022 | Dicker | |
| 2022/0329670 A1 | 10/2022 | Barreto | |
| 2023/0005363 A1 | 1/2023 | Knoepfle | |
| 2023/0215276 A1 | 7/2023 | Kuncl | |
| 2023/0267565 A1 | 8/2023 | Levi | |
| 2024/0169461 A1 | 5/2024 | Kim | |
| 2024/0323263 A1 | 9/2024 | Barreto | |
| 2024/0428151 A1 | 12/2024 | Camp | |

FOREIGN PATENT DOCUMENTS

| | | |
|---|---|---|
| CN | 103856532 | 6/2014 |
| CN | 105575103 | 5/2016 |
| DE | 10201607712 | 11/2016 |
| EP | 2293523 | 3/2011 |
| GB | 2367979 | 4/2002 |
| JP | 2002-133592 | 5/2002 |
| JP | 2004-192366 | 7/2004 |
| JP | 2005-107942 | 4/2005 |
| JP | 2006-339810 | 12/2006 |
| JP | 2010-286908 | 12/2010 |
| JP | 2001-188996 | 7/2011 |
| JP | 2012-194687 | 10/2012 |
| JP | 2013-175144 | 9/2013 |
| JP | 2014-238831 | 12/2014 |
| KR | 10-2012-0079549 | 6/2012 |
| WO | WO 1999/044186 | 2/1999 |
| WO | WO 2002/006994 | 1/2002 |
| WO | WO 2005/013588 | 2/2005 |
| WO | WO 2011/069170 | 6/2011 |

OTHER PUBLICATIONS

Huang, Y. et al.; Large Scale Real-time Ridesharing with Service Guarantee on Road Networks; Sep. 1-5, 2014; VLDB Endowment, vol. 7, No. 14; pp. 2017-2028 (Year: 2014).*

Furuhata, M., "Ridesharing" The State-of-the-Art and Future Directions, Apr. 15, 2013, Elsevier Ltd., Transportation Research Part B 57, pp. 28-46 (2013).

Huang, Y., Large Scale Real-time Ridesharing with Service Guarantee on Road Networks, Sep. 1-5, 2014, VLDB Endowment, vol. 7, No. 14, pp. 2017-2018 (2014).

Mukai, Dynamic Location Management for On-Demand Car Sharing System, 2005, In: Khosia R., Howlett R.J., Jain L.C. (eds) Knowledge-Based Intelligent Information and Engineering Systems, KES 2005. Lecture Notes in Computer Science, vol. 3681. Springer, Berlin, Heidelberg, pp. 768-744 (2005).

How does Uber Work? available at https://help.uber.com/h/738d1ff7-5fe0-4383-b34c-4a2480efd71e (Year: 2016).

Rosenblat, Alex, Algorithmic labor and information asymmetries: A case study of Uber's drivers, International journal of communication 10: Jul. 2016.

ISR/Written Opinion in International Application No. PCT/US2015/046388, dated Nov. 17, 2015.

EESR in EP Application No. 15833693.3 dated Jan. 18, 2018.

Office Action dated Sep. 20, 2018 in EP 15833693.3.

EESR in EP 19165275.9 dated Apr. 18, 2019.

International Search Report and Written Opinion issued in PCT/US2016/062344 dated Jan. 31, 2017.

Office Action in BR 1120180097799 dated Aug. 27, 2020.

ISR and Written Opinion in PCT/US2018/017941 dated Apr. 27, 2018.

ISR and Written Opinion issued in PCT/US2018/023887 dated Jun. 8, 2018.

IPRP in PCT/US2018/023887 dated Mar. 19, 2019.

Examination Report No. 1 in AU 2016555549 dated Nov. 16, 2020.

OA in CN 201880030237.0 dated Jul. 28, 2020.

Examination Report No. 2 in AU 2016355549 dated Jun. 29, 2021.

Search Report in BR112018009779-9 dated Aug. 27, 2020.

Technical Exam Report in BR112018009779-9 dated Dec. 2, 2020.

Examination Report No. 1 in AU 2018221432 dated Jan. 31, 2022.

Technical Exam Report in BR112018009779-9 dated Jul. 27, 2022.

(56) References Cited

OTHER PUBLICATIONS

Fang, Zhihan, MAC: Measuring the Impacts of Anomalies on Travel Time of Multiple Transportation Systems, Proc. ACM Interact. Mob. Wearable Ubiquitous Technol. 3, 2, Article 42 (Jun. 2019), 24 pages.
Lalos, A Framework for Dynamic Car and Taxi Pools with the Use of Positioning Systems, 2009 Computation World: Future Computing, Service Computation, Cognitive, Adaptive, Content, Patterns, Nov. 15-20, 2009 (Year 2009).
Office Action in BR 112018075358 dated Sep. 24, 2024.
Office Action in BR 112018075358 dated Jan. 28, 2025.

\* cited by examiner

NETWORK SYSTEM TO FILTER REQUESTS BY DESTINATION AND DEADLINE

CROSS REFERENCE TO RELATED APPLICATION

This application is a continuation of U.S. patent application Ser. No. 17/188,898, filed Mar. 1, 2021, which is a continuation of U.S. patent application Ser. No. 15/866,284, filed Jan. 9, 2018, now U.S. Pat. No. 10,937,115, which is a continuation of U.S. patent application Ser. No. 15/432,766, filed Feb. 14, 2017, now U.S. Pat. No. 9,898,791; the aforementioned priority applications being hereby incorporated by reference in their respective entireties.

BACKGROUND

A network service can enable users to request and receive various services through applications on mobile computing devices. The network service typically selects a service provider to fulfill the request for service based on user-specified data from the request. These service providers can interact with the network service to accept or decline service requests, receive data about the requesting users, and set various status modes such as whether the provider is online and available to fulfill requests or offline.

DETAILED DESCRIPTION

Figure 1:
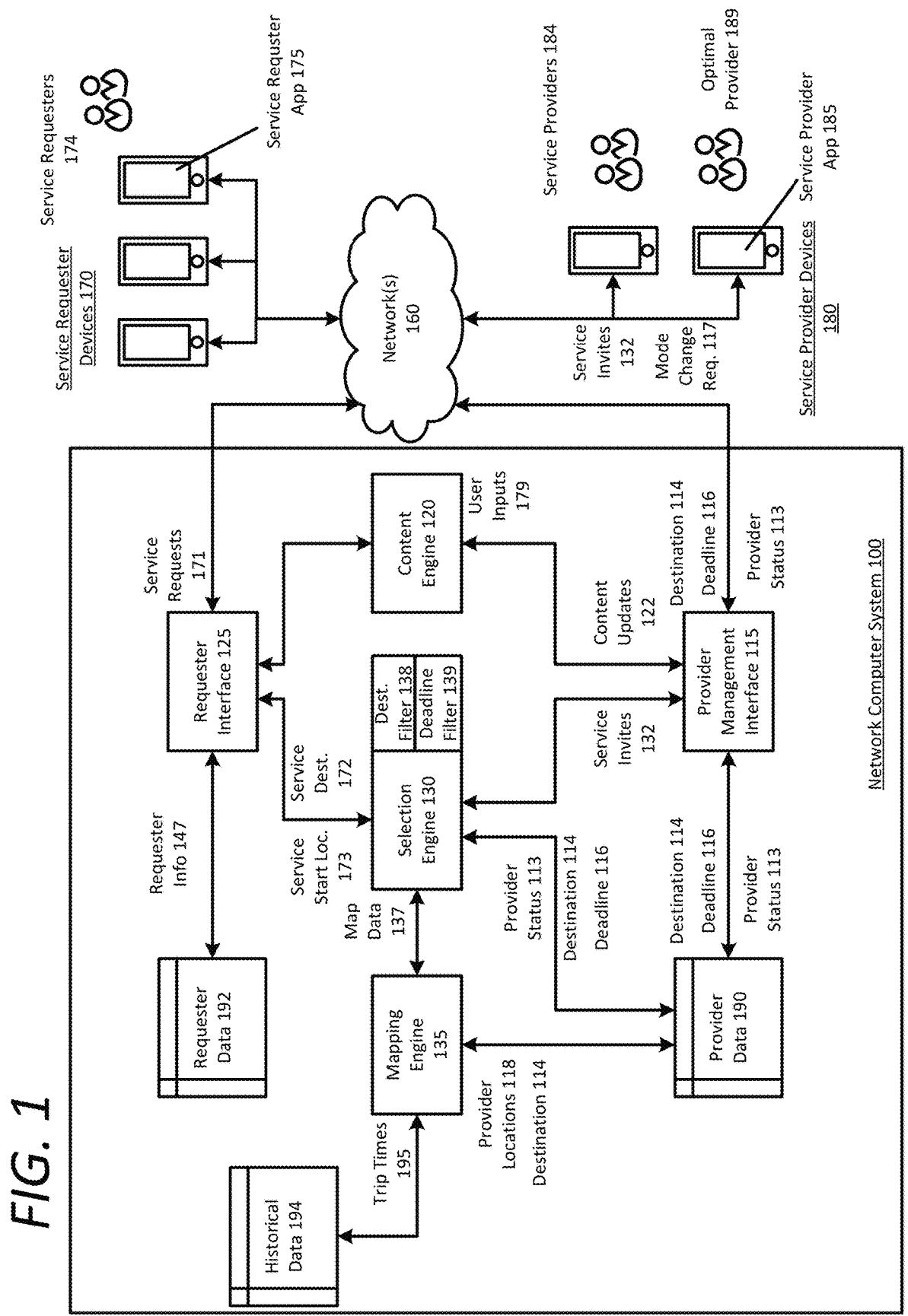
FIG. 1 is a block diagram illustrating an example network computer system in communication with service requester and service provider devices, in accordance with examples described herein.

A network computer system is provided herein that manages an on-demand network-based service linking available service providers with service requesters throughout a given region (e.g., a metroplex such as the San Francisco Bay Area). According to examples, the network computer system can receive service requests for on-demand services (e.g., transport service or delivery service) from requesting users (e.g., a rider) via a designated service requester application executing on the users' mobile computing devices. Based, at least in part, on a service start location, the network computer system can identify a number of proximate available service providers (e.g., a driver) and transmit a service invitation message to one or more service provider devices of the proximate available service providers to fulfill the service request (e.g., provide or perform the corresponding service). In many examples, the service providers can either accept or decline the invitation based on, for example, the service start location or service destination being impractical for the service provider.

In some examples, in selecting a service provider to fulfill a given service request, the network computer system can identify a plurality of candidate service providers to fulfill the service request based on a service start location indicated in the service request. For example, the network computer system can determine a geo-fence (e.g., a region specified by three or more location points or a defined area, such as a hexagon from an array of hexagons) surrounding the service start location (or a geo-fence defined by a radius away from the service start location), identify a set of candidate service providers (e.g., twenty or thirty service providers within the geo-fence), and select an optimal service provider (e.g., closest service provider to the service start location, service provider with the shortest estimated travel time from the service start location, service provider traveling to a location within a specified distance or specified travel time to the destination location, etc.) from the candidate service providers to fulfill the service request. According to examples provided herein, the network computer system can compile historical data for individual service requesters with regard to the network-based service. Thus, the network computer system can manage a service requester profile for each service requester indicating routine start and/or end locations (or regions), and/or routine routes (e.g., for a transportation service from home to work and/or vice versa) and preferred service types (e.g., transportation, delivery, mailing, etc.). In some examples, the network computer system can further synchronize with a service requester device to, for example, identify the service requester's contacts, the service requester's schedule and appointments, travel plans (e.g., a scheduled trip), and the like.

In conventional service requester applications used with on-demand service systems, service providers may be reluctant to go online or stay online when they have limited time because of fears that trips could lead them far away from a desired destination, such as home or work. If the provider needs to be at a specified destination by a given deadline, they may choose to play it safe and not risk providing services at all.

In various implementations described herein, the service provider is able to specify at what time they want to arrive at a specific destination. With those data, an example network computer system can operate to filter service requests to obey a set of constraints that allow a service provider to be at a desired or specified destination by a deadline time. Additionally or alternatively, in one example, when the network computer system receives a service request, the network computer system can determine whether to include the service provider (who specified a desired destination and deadline) in the set of candidate service providers to fulfill the service request based on the data provided. The network computer system can then select a service provider from this set. Thus, the network computer system can ensure that the service provider is not chosen to receive service invitations or be assigned to services that would take that service provider too far away from the desired destination such that he or she could not arrive there prior to the requested deadline. In addition, the network computer system ensures that not only can the service provider arrive at the desired destination prior to the deadline, but also that the provider has sufficient time to provide services to requesting users near the estimated route from the provider's current location to the desired destination. Moreover, once the network computer system determines that it is time for the service provider to head towards the destination, it confirms with the service provider that he or she still wants to be at the specified destination by the deadline. Once confirmed, the network computer system filters out any service requests in which the service start location and the service destination are not roughly along a route of travel from the provider's current location to the desired destination. That is, the network computer system can filter out the service provider from a candidate pool of drivers for any invitations for services that are not in a similar direction as the route of travel. In some aspects, the network computer system 100 can determine that a request for service is along a route of travel when the request has a service start location and/or service destination that are within a threshold distance from a point along the route of travel.

Among other benefits, the examples described herein achieve a technical effect of providing on-demand network-based service providers (e.g., an on-demand transportation service) with increased control and stability over scheduling. By programmatically filtering service requests by destination and deadline, the network computer system prevents service providers from providing services that would otherwise have led them too far away to make it to their desired destinations at specified deadline times. This gives service providers more peace of mind and flexibility when providing services through the network computer system, which can increase the average usage of the system and reduce waiting times for users.

According to examples described herein, a network computer system receives provider data corresponding to a desired destination and a deadline from a service provider. The network computer system tracks a current location of the service provider through a device equipped with one or more location-based resources and receives request data corresponding to requests for service from users. The network computer system analyzes the request data for each of the requests for service to identify a subset of the requests in which the service provider is determined to be able to fulfill the request and travel to the desired destination before the deadline. In other words, the network computer system can identify, from the plurality of requests, one or more requests that are assignable to the service provider based on a determination that the service provider is capable of providing service and traveling to the specified destination before the deadline. The network computer system transmits an invitation to the service provider to fulfill one of the requests for service from the identified subset.

As provided herein, the terms "user" and "service requester" are used throughout this application interchangeably to describe a person or group of people who utilize a requester application on a computing device to request, over one or more networks, on-demand services from a network computing system. The term "service provider" is used to describe a person utilizing a provider application on a computing device to provide on-demand services to the service requesters.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable media on which instructions for implementing some aspects can be carried and/or executed. In particular, the numerous machines shown in some examples include processor(s) and various forms of memory for holding data and instructions. Examples of computer-readable media include permanent memory storage devices, such as hard drives on personal computers or servers. Other examples of computer storage media include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable media.

Alternatively, one or more examples described herein may be implemented through the use of dedicated hardware logic circuits that are comprised of an interconnection of logic gates. Such circuits are typically designed using a hardware description language (HDL), such as Verilog and VHDL. These languages contain instructions that ultimately define the layout of the circuit. However, once the circuit is fabricated, there are no instructions. All the processing is performed by interconnected gates.

System Overview

FIG. 1 is a block diagram illustrating an example network computer system in communication with service requester and service provider devices, in accordance with examples described herein. The network computer system 100 can implement or manage a network service (e.g., an on-demand transport or delivery arrangement service) that connects service requesters 174 with service providers 184 that are available to fulfill the service requests 171 that service requesters 174 transmit to the network computer system 100. The network service can enable services to be requested by service requesters 174 and provided by available service providers 184 by way of a service requester application 175 executing on the service requester devices 170, and a service provider application 185 executing on the service provider devices 180. As used herein, a service requester device 170 and a service provider device 180 can comprise computing devices with functionality to execute designated applications corresponding to the on-demand arrangement service managed by the network computer system 100. In many examples, service requester devices 170 and service provider devices 180 can comprise mobile computing devices, such as smartphones, tablet computers, virtual reality or augmented reality headsets, on-board computing systems of vehicles, and the like. Example network services can comprise delivery of food or products, package mailing, shopping, construction, plumbing, home repair, housing or apartment sharing, etc., or can include transportation arrangement services.

The network computer system 100 can include a provider management interface 115 to communicate over one or more networks 160 with the service provider application 185 running on service provider devices 180. According to examples, service providers 184 register with the network computer system 100 to receive service invitations 132 through the service provider application 185 to fulfill service requests 171 submitted by the service requesters 174. In an example using transport services, the service requesters 174 are prospective passengers who want to be picked up and transported, and the service providers 184 are drivers who transport the service requesters 174.

Service providers 184 can select various states or modes within the service provider application 185, such as an online mode that indicates the service provider 184 is available and willing to fulfill service invitations 132. Service providers 184 can also select from various types of transport service that the provider offers, including ride-pooling, a basic ride-share service type, a luxury vehicle service type, etc. In addition, service providers 184 can set one or more constraints on their schedule, such as a desired destination 114 and/or deadline 116.

In some situations, service providers 184 make themselves available to perform services for a block of time in a manner similar to a work shift or at sporadic times whenever convenient for the provider. For example, a driver providing transport services may choose to only pick up passengers during a morning commute or on the way home in the evening. In the normal course of providing on-demand services, the service providers 184 can either park and wait or drive around a region waiting for nearby users to request services. However, service providers 184 may be reluctant to go online or stay online when they have limited time because of fears that trips could lead them far away from a desired destination such as home or work. Therefore, the network computer system 100 can operate to filter service requests 171 to obey a set of constraints that allow a service provider 184 to be at a desired destination 114 by a deadline 116.

In accordance with various examples, the service provider device 180 transmits a provider status 113, which can include any selected modes, the current location of the service provider 184, and other provider information, over the network 160 to the provider management interface 115. In addition, the service provider device 180 can transmit a desired destination 114 and deadline 116 to the provider management interface 115 when the service provider 184 chooses to enter a filtering mode. In some implementations, the service provider devices 180 can determine the current location of the service provider 184 using location-based resources of the service provider devices 180 (e.g., global positioning system (GPS) resources). The service provider application 185 can continually update the provider status 113 on a regular schedule or in response to provider input to the service provider device 180, location changes determined by GPS, service steps performed, etc. The provider management interface 115 stores the provider status 113 in a provider data store 190 (e.g., a database or data structure) accessible by a selection engine 130 that processes incoming service requests 171 in order to select service providers 184 to fulfill the service requests 171.

The network computer system 100 can include a service requester interface 125 to communicate with service requester devices 170 over one or more networks 160 via a service requester application 175. According to examples, a service requester 174 wishing to utilize the on-demand arrangement service can launch the service requester application 175 and transmit a service request 171 over the network 160 to the network computer system 100. In certain implementations, the service requester 174 can view multiple different service types managed by the network computer system 100, such as ride-pooling, a basic ride-share service type, a luxury vehicle service type, a van or large vehicle service type, professional services (e.g., where the service provider is certified), an on-demand self-driving vehicle service, and the like. The network computer system 100 can utilize service provider locations to provide the service requester devices 170 with estimated time to arrival (ETA) data of proximate service providers 184 for each respective service. In one implementation, the service requester application 175 can enable the service requester 174 to scroll through each service type. In response to a soft selection of a particular service type, the network computer system 100 can provide ETA data on a user interface of the service requester application 175 that indicates an ETA of the closest service provider 184 for the service type and/or the locations of all proximate available service providers 184 for that service type. As the service requester 174 scrolls through each service type, the user interface can update to show visual representations of the service providers 184 for that service type on a map centered on the service requester 174 or a chosen service start location 173. The service requester 174 can interact with the user interface of the service requester application 175 to select a particular service type and transmit a service request 171.

In some examples, the service request 171 can include a service start location 173 within a given region (e.g., a metropolitan area managed by one or more datacenters corresponding to the network computer system 100) where a matched service provider is to rendezvous with the service requester 174. The service requester 174 can input the service start location 173 by setting a location pin on a user interface of the service requester application 175, or the service start location 173 can be determined by a current location of the service requester 174 (e.g., utilizing location-based resources of the service requester device 170). Additionally, the service requester 174 can input a service destination 172 during or after submitting the service request 171. In an example using transport services, the service requester 174 is a prospective passenger that wants to be picked up at the service start location 173 and dropped off at the service destination 172.

The network computer system 100 can include a mapping engine 135, or can utilize a third-party mapping service, to generate map data 137 and or traffic data in the environment surrounding the service start location 173. The mapping engine 135 can retrieve service provider locations 118 from the provider data store 190 and input them onto the map data 137. The selection engine 130 can utilize the provider locations 118 in order to select an optimal service provider 189 to fulfill the service request 171. As provided herein, the optimal service provider 189 can be a provider that is closest to the service requester 174 with respect to distance or time, or can be a proximate provider that is optimal for other reasons, such as the provider's experience, the amount of time the provider has been on the clock, the provider's current earnings, and the like.

In some aspects, the selection engine 130 can implement filters, including destination filter 138 and deadline filter 139, to ensure that service providers 184 are not chosen to receive service invitations 132 that would take them too far away from a desired destination 114 such that they could not arrive there prior to a deadline 116. Using the service provider application 185, service providers 184 can input a deadline 116 specifying what time they would like to stop providing service and a destination 114 specifying where they would like to be at that time. The service provider device 180 can send provider data corresponding to the desired destination 114 and deadline 116 to the provider management interface 115. For example, a driver providing transport services could select that he or she wants to be home at 7 p.m. In this example, the destination is the provider's home address and the deadline is 7 p.m. In one alternative implementation, the provider management interface 115 can programmatically determine the destination 114 and deadline 116 for use cases such as hourly rentals.

The provider management interface 115 can process the destination 114 and deadline 116 request and update a mode assigned to the service provider 184 to reflect the new settings. In some aspects, the provider management interface 115 can verify the destination 114 and any constraints on the minimum and maximum acceptable deadlines 116 to confirm the validity of the request. The provider management interface 115 can also determine whether the service provider 184 meets any necessary conditions to activate the deadline filter mode. For example, features of the deadline filter mode, such as the ability to specify a destination, may be limited in frequency of use. Once verified, the provider management interface 115 can place the service provider 184 in the deadline filter mode. In this mode, the selection engine 130 attempts to ensure that the service provider 184 does not receive service invitations 132 that would take the provider too far away from the destination 114 such that he or she would be unable to reach the desired destination 114 by the deadline 116. The provider management interface can also save the provider data in the provider data store 190 and retain these data even when the service provider 184 goes offline for breaks or other reasons.

In order to ensure that the service provider 184 can reach the desired destination 114 by the deadline 116, the network computer system 100 tracks the current location of the service provider 184, and the selection engine 130 estimates how long it should take the service provider 184 to reach the destination 114 while providing services to requesting users along the way. At periodic intervals while the service provider 184 is in deadline filter mode, such as every time the current location of the service provider 184 changes or once per minute, the selection engine 130 adds the estimate to the current time and compares that to the deadline 116 to determine whether the deadline threshold has been reached.

The estimate of how long it should take the service provider 184 to reach the destination 114 includes estimates for the time it would take to get to the destination 114 if the service provider 184 went there directly from the current location plus any time spent providing services to requesting users along the way. In one aspect, the selection engine 130 can implement a destination filter mode that offers service providers 184 only the service requests 171 that the provider can fulfill along the way to the specified destination 114. In an example where the service provider 184 is a driver offering transport services, the time spent providing services can account for expected delays that arise through taking a detour to pick riders up and drop them off as well as expected wait times for riders to get in and out of the car. This time can be expressed as the expected_time_to_arrival_with_destination_filter. One example estimate for that time is:

direct_time_to_destination_from_current_location*1.5+20 minutes

The direct_time_to_destination_from_current_location is estimated from mapping resources, such as the mapping engine 135, and the constants are configurable. The multiplier accounts for the fact that a longer distance tends to yield more intermittent service requests 171. The offset ensures enough buffer time when the destination 114 is nearby. In other aspects, historical data of trip times 195 from a historical data store 194 that are collected from service providers 184 in the destination filter mode are used to estimate the expected_time_to_arrival_with_destination_filter.

As soon as the calculated duration is equal to or greater than the time left until the deadline 116 the provider set, the provider management interface 115 informs the service provider 184 that it is time to head to the destination 114 through a mode change request 117 prompt displayed on the service provider device 180. If the service provider 184 is currently providing service to a user when the provider management interface 115 determines that it is time to head towards the destination 114, the service provider application 185 can wait until the service is completed and then inform the service provider 184 that he or she should head to the destination 114.

In response to the prompt to head to the destination 114, the service provider 184 can choose to enter destination filter mode, set a new deadline 116, or remove the deadline 116 entirely. The provider management interface 115 can then process the service provider 184 response to the prompt. If the service provider 184 chooses to enter destination filter mode (e.g., by providing input), the provider management interface 115 sets the provider mode and expects the provider to travel towards the destination 114. From then on, the selection engine 130 offers the service provider 184 only service invitations 132 that are on the route from the current location to the destination 114. Therefore, in destination filter mode, the invites offered to the service provider 184 should not take the service provider 184 too far away from the route such that he or she cannot make it to the destination 114 prior to the deadline 116. In some aspects, the service provider 184 can configure destination filter mode settings so that service invitations 132 can cause the deadline 116 to be exceeded by a fudge factor (e.g., 5 minutes). Additionally, in some examples, while in destination filter mode, the service provider 184 can receive preferential treatment (i.e., boosting) from the network computer system 100 and is considered higher priority than providers in normal mode for service invitations 132 that are along the route.

Prior to the deadline threshold being reached, the selection engine 130 offers the service provider 184 service invitations 132 without any restrictions on direction. However, the offered service invitations 132 are constrained by a deadline filter 139 that checks whether the service provider 184 has time to fulfill the service invitation 132 and still reach the destination 114 while providing services to requesting users along the way. Therefore, when the requester interface 125 receives a service request 171 from a user, the selection engine 130 estimates the time required for the service provider 184 to travel from the current location to the service start location, the service start location to the service destination, and the service destination to the desired destination 114.

In order to determine whether a received service request 171 passes the deadline filter 139, the selection engine 130 can calculate an expected time for the service provider 184 to complete the service request 171. In one example, the expected time at completion is the current time plus an estimate for the time to travel from the current location to the service start location and then from the service start location to the service destination, taking into account factors such as traffic conditions and time required at each location to perform aspects of the service. The deadline filter 139 can additionally estimate how long it should take the service provider 184 to travel from the service destination to the desired destination 114 while still accepting and fulfilling service requests 171 along the way to the desired destination 114, expressed as the expected_time_to_arrival_with_destination_filter. One example estimate for that time is:

direct_time_to_destination_from_service_destination*1.5+20 minutes

As with the deadline threshold, the deadline filter calculation can estimate direct_time_to_destination_from_service_destination from mapping resources, such as the mapping engine 135 and trip times 195 from a historical data store 194. In some implementations, the constants can be configured to more accurately estimate times if data show that the default constants are suboptimal. The multiplier accounts for the fact that a longer distance tends to yield more intermittent service requests 171. The offset ensures enough buffer time when the destination 114 is nearby. In other aspects, historical data collected from service providers 184 in the destination filter mode are used to estimate the expected_time_to_arrival_with_destination_filter. As a result, the deadline filter 139 more aggressively filters out service requests 171 as the deadline 116 approaches and/or the service provider 184 travels further from the desired destination 114.

The deadline filter 139 then adds the expected time at completion and the expected_time_to_arrival_with_destination_filter and compares the result to the deadline 116. If the result is on or before the deadline 116, the request passes the destination filter and the service provider 184 is a possible candidate for fulfilling the service request 171. If the result is after the deadline 116, the network computer system 100 filters out the service provider 184 from a candidate set of providers and instead chooses a different provider from the candidate set to fulfill the service request 171. In alternative implementations, the selection engine 130 can instead choose an optimal service provider 189 from the candidate set of providers prior to checking whether the request passes any filters. In this case, if the chosen optimal service provider 189 is in deadline filter mode, the selection engine 130 then checks whether the request passes the deadline filter 139, and if not, chooses the next available service provider 184.

Once the optimal service provider 189 is selected, the selection engine 130 can generate a service invitation 132 to fulfill the service request 171 and transmit the service invitation 132 to the optimal service provider's device via the service provider application 185. In addition to the service invitation 132, the network computer system 100 can transmit requester information 147, such as a name and photograph of the service requester 174, from a requester data store 192. Upon receiving the service invitation 132, the optimal service provider 189 can either accept or reject the invitation 132. Rejection of the invitation 132 can cause the selection engine 130 to determine another optimal service provider 189 from the candidate set of service providers 184 to fulfill the service request 171. However, if the optimal service provider 189 accepts (e.g., via an acceptance input), then the acceptance input is transmitted back to the selection engine 130, which generates and transmits a confirmation of the optimal service provider 189 to the service requester 174 via the service requester application 175 on the service requester device 170.

In some aspects, the provider management interface 115 can continue monitoring the deadline threshold while the service provider 184 is fulfilling a service request 171. If the service provider 184 is currently providing service to a user when the provider management interface 115 determines that it is time to head towards the destination 114, the service provider application 185 can wait until the service is completed and then inform the service provider 184 that he or she should head to the destination 114. Since the request for the current service being performed passed the deadline filter 139, this can happen only in situations where traffic conditions on the route worsen significantly or other aspects of the service request 171 take significantly longer than estimated.

Prior to reaching the destination 114, the destination filter 138 on the selection engine 130 filters out service requests 171 so that the provider is only offered service invitations 132 that are along the route from the provider's current location to the destination 114. Therefore, when the network computer system 100 receives a service request 171 from a user, the network computer system 100 checks the service start location and service destination and determines whether paths from the provider's current location to the service start location and service destination are near or along the route from the current location to the desired destination 114. If they are not, the selection engine 130 filters out the service provider 184.

According to examples provided herein, the network computer system 100 can include a content engine 120 that manages the manner in which content is displayed on the service requester devices 170 and/or the service provider devices 180. Regarding the service requester devices 170, the content engine 120 can provide content updates based on user inputs 179 on a user interface generated by the service provider application 185. For example, a user selection on a content feature of the service provider application 185 can cause the content engine 120 to generate a new screen on the service provider application 185 or cause a current screen to pivot between certain displayed features. When inputting a particular destination 114, the service provider 184 may utilize a location pin and map content and set the location pin on a particular location in the map content to input the destination 114. Additionally, the content engine 120 can adjust the look and feel of a deadline input box to overlay the map content, which can enable the service provider 184 to select a time for the deadline 116.

In various implementations, the requester data store 192 can store service requester profiles specific to the individual users of the on-demand service. Such information can include user preferences of service types, routine routes, service start locations 173 and service destinations 172, work addresses, home addresses, addresses of frequently visited locations (e.g., a gym, grocery store, mall, local airport, sports arena or stadium, concert venue, local parks, and the like). In addition, the provider data store 190 can store service provider profiles indicating information specific to individual providers, such as vehicle type, service qualifications, earnings data, and provider experience. Database 140 can also store historical data 141 regarding service requester and service provider liquidity for a given area, that is, how often a new service provider 184 is expected to make themselves available for on-demand services in the area.

Figure 2:
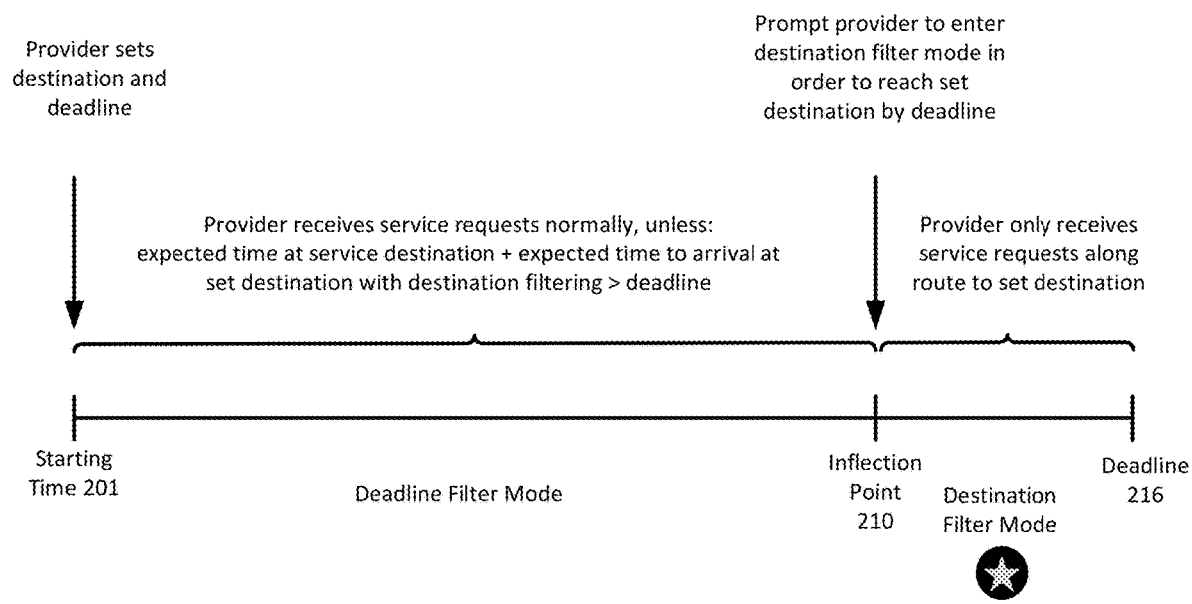
FIG. 2 is a timeline illustrating examples of events that can occur while providing services in a deadline filter mode, in accordance with examples described herein.

FIG. 2 is a timeline illustrating examples of events that can occur while providing services in a deadline filter mode, in accordance with examples described herein. At the start of the timeline, the network computer system 100 can receive a destination and a deadline from a service provider that specify what time the service provider would like to stop providing service and where that service provider would like to be at that time. For example, a driver could select that he or she wants to be home at 7 p.m. In this example, the destination is the provider's home address and the deadline is 7 p.m.

At starting time 201, a provider management interface 115 of the network computer system 100 can process the destination and deadline request and update the mode assigned to the service provider to reflect the received destination and deadline. In some aspects, the provider management interface 115 can verify the destination and any constraints on the minimum and maximum acceptable deadlines to confirm the validity of the request. The provider management interface 115 can also determine whether the service provider meets any necessary conditions to activate the deadline filter mode. For example, features of the deadline filter mode, such as the ability to specify a destination, may be limited in frequency of use. Once verified, the provider management interface 115 can place the service provider in the deadline filter mode. In this mode, the network computer system 100 attempts to ensure that the service provider does not receive service invitations that would take the provider too far away from the destination such that he or she would be unable to reach the desired destination by the deadline.

Prior to the deadline threshold being reached, the network computer system 100 offers the service provider service invitations without any restrictions on direction. However, the offered service invitations are constrained by a deadline filter that checks whether the service provider has time to fulfill the service invitation and still reach the destination while providing services to requesting users along the way (i.e., traveling to the destination in destination filter mode). For example, when the network computer system 100 receives a service request from a user, the network computer system 100 estimates the time required for the service provider to travel from the current location to the service start location, the service start location to the service destination, and the service destination to the desired destination. In an example using transport services, the user is a prospective passenger that wants to be picked up at the service start location and dropped off at the service destination.

In order to determine whether a received service request passes the deadline filter, the network computer system 100 can calculate an expected time for the service provider to complete the service request. In one example, the expected time at completion is the current time plus an estimate for the time to travel from the current location to the service start location and then from the service start location to the service destination, taking into account factors such as traffic conditions and time required at each location to perform aspects of the service. The deadline filter can additionally estimate how long it should take the service provider to travel from the service destination to the desired destination while still accepting and fulfilling service requests along the way to the desired destination, expressed as the expected_time_to_arrival_with_destination_filter. One example estimate for that time is:

$$direct\_time\_to\_destination\_from\_service\_destination * 1.5 + 20 \text{ minutes}$$

The deadline filter calculation can estimate direct_time_to_destination_from_service_destination from mapping resources, such as the mapping engine 135, and the constants are configurable. The multiplier accounts for the fact that a longer distance tends to yield more intermittent service requests. The offset ensures enough buffer time when the destination is nearby. In other aspects, historical data collected from service providers in the destination filter mode are used to estimate the expected_time_to_arrival_with_destination_filter.

The deadline filter then adds the expected time at the service destination and the expected_time_to_arrival_with_destination_filter and compares the result to the deadline. If the result is on or before the deadline, the request passes the destination filter and the service provider is a possible candidate for fulfilling the service request. If the result is after the deadline, the network computer system 100 filters out the service provider from a candidate set of providers and instead chooses a different provider from the candidate set to fulfill the service request. In alternative implementations, the network computer system 100 can instead choose an optimal service provider from the candidate set of providers prior to checking whether the request passes any filters. In this case, if the chosen optimal service provider is in deadline filter mode, the network computer system 100 then checks whether the request passes the deadline filter, and if not, chooses the next available service provider.

In order to ensure that the service provider can reach the desired destination by the deadline, the network computer system 100 tracks the current location of the service provider and estimates how long it should take the service provider to reach the destination while providing services to requesting users along the way (i.e., traveling to the destination in destination filter mode). At periodic intervals while the service provider is in deadline filter mode, such as every time the current location of the service provider changes or once per minute, the network computer system 100 adds the estimate to the current time and compares that to the deadline to determine whether the deadline threshold has been reached.

Once the deadline threshold is reached at inflection point 210, the network computer system 100 informs the service provider that it is time to head to the destination through a prompt displayed on the service provider device 180. If the service provider is currently providing service to a user when the network computer system 100 determines that it is time to head towards the destination, the service provider application 185 can wait until the service is completed and then inform the service provider that he or she should head to the destination.

In response to the prompt to head to the destination, the service provider can choose to enter destination filter mode, set a new deadline, or remove the deadline entirely (e.g., by providing input). The network computer system 100 can then process the service provider response to the prompt. If the service provider chooses to enter destination filter mode, the network computer system 100 sets the service provider mode and expects the provider to travel towards the destination. From then on, the network computer system 100 offers the service provider only service invitations that are along the route from the current location to the destination. Therefore, in destination filter mode, the invites offered to the service provider should not take the service provider too far away from the route such that he or she cannot make it to the destination prior to the deadline 216. In some aspects, the service provider can configure destination filter mode settings so that service invitations can cause the deadline to be exceeded by a fudge factor (e.g., 5 minutes). Additionally, while in destination filter mode, the service provider can receive preferential treatment (i.e., boosting) from the network computer system 100 and is considered higher priority than providers in normal mode for service invitations that are along the route.

When the service provider is available to receive a new service invitation (either through rejecting an invitation or completing service), the network computer system 100 or the service provider device 180 itself can monitor the service provider location to determine if the provider has arrived at the desired destination. Once the provider has arrived at the desired destination, the service provider application 185 can place the service provider in an offline mode wherein the provider is not available to receive service invitations.

In one example use case, a service provider named Joe leaves his house at 10 a.m. to provide transport services to local passengers. As he leaves the house in the morning, he sets his desired destination to his home address in Palo Alto, California and specifies an arrival deadline of 6 p.m. His provider status is updated to the online state (e.g., available to provide service) and he soon receives and accepts a service invitation 132 to transport a passenger to San Jose. While he is providing service, the provider status is in the busy or "on-trip" state.

At 11 a.m. in San Jose, Joe receives and accepts a service invitation with a drop off location in San Francisco. At 1 p.m. in San Francisco, Joe goes offline using the service provider application 185 and takes a one-hour lunch break. While on break, the network computer system 100 can retain Joe's destination and deadline settings so that they persist when he comes back online. At 2 p.m. in San Francisco, Joe comes online and receives a service invitation 132 sending him to Oakland, where he receives multiple local service invitations 132 and drives around the Oakland area.

At 4 p.m. in Oakland, a user near Joe requests a ride to San Jose. However, the network computer system 100 estimates that it would take Joe 1.5 hours to pick up the user and drive to San Jose in current traffic conditions. The network computer system 100 further estimates that Joe could not get from San Jose at 5:30 p.m. to his home in Palo Alto by the 6 p.m. deadline. Therefore, the network computer system 100 filters out Joe and chooses a different driver to take the user to San Jose. Instead, Joe receives a service invitation 132 back to San Francisco that meets the deadline threshold.

At 4:30 p.m. in San Francisco, another user near Joe requests a ride to South San Francisco. The network computer system 100 estimates that Joe would arrive by 5:15 p.m., and that the direct time from South San Francisco to Palo Alto is 40 minutes. Therefore, Joe's expected estimated time to arrival (ETA) would be 5:55 p.m. However, using the example destination filtering formula, the network computer system 100 estimates that it would take 80 minutes (1.5*40 minutes+20 minutes) for Joe to drive from South San Francisco to Palo Alto while fulfilling service requests along the route in destination filter mode. So despite being able to fulfill the service request to South San Francisco and reach his desired destination by the deadline, Joe would not have time to fulfill further service requests while driving from South San Francisco to Palo Alto. As a result, the network computer system 100 filters out Joe and chooses a different driver to take the user to South San Francisco.

Instead, Joe receives a request from a user who wants a ride to Menlo Park with an ETA at 5:25 p.m. The network computer system 100 estimates the time from Menlo Park to Joe's home as 6 minutes. Therefore, Joe's expected_time_to_arrival_with_destination_filter is 1.5*6 minute+20 minutes, which is 29 minutes. As it is currently 5:25 p.m., Joe's expected arrival time at home while in destination filter mode is 5:54 p.m. This is before Joe's 6 p.m. deadline so he receives the service invitation, which he accepts.

Joe drops off the rider in Menlo Park at 5:25 p.m. The network computer system 100 determines that Joe should begin heading to his destination in order to reach it before the 6:00 p.m. deadline. A prompt appears on his device telling Joe that it is time to head home. After Joe confirms, the network computer system 100 switches Joe into destination filter mode to ensure he only receives service invitations that are near or along the route from his current location in Menlo Park to his desired destination in Palo Alto. That is, the network computer system 100 filters out Joe from a candidate pool of drivers for any invitations for services that are not in a similar direction as his route of travel. In some aspects, the network computer system 100 can determine that a request for service is along a route of travel when the request has a service start location and/or service destination that are within a threshold distance from a point along the route of travel.

At 5:28 p.m. in Menlo Park, Joe receives one final service invitation to pick up a nearby user and drop her off at an address roughly on the way and 8 minutes from Joe's house in Palo Alto. He receives the invitation because the network computer system 100 estimates he can make it to the drop off location by 5:50 p.m. At 5:50 p.m., Joe drops off the rider and drives home, where he arrives and goes offline at 5:58 p.m.

Methodology

Figure 3:
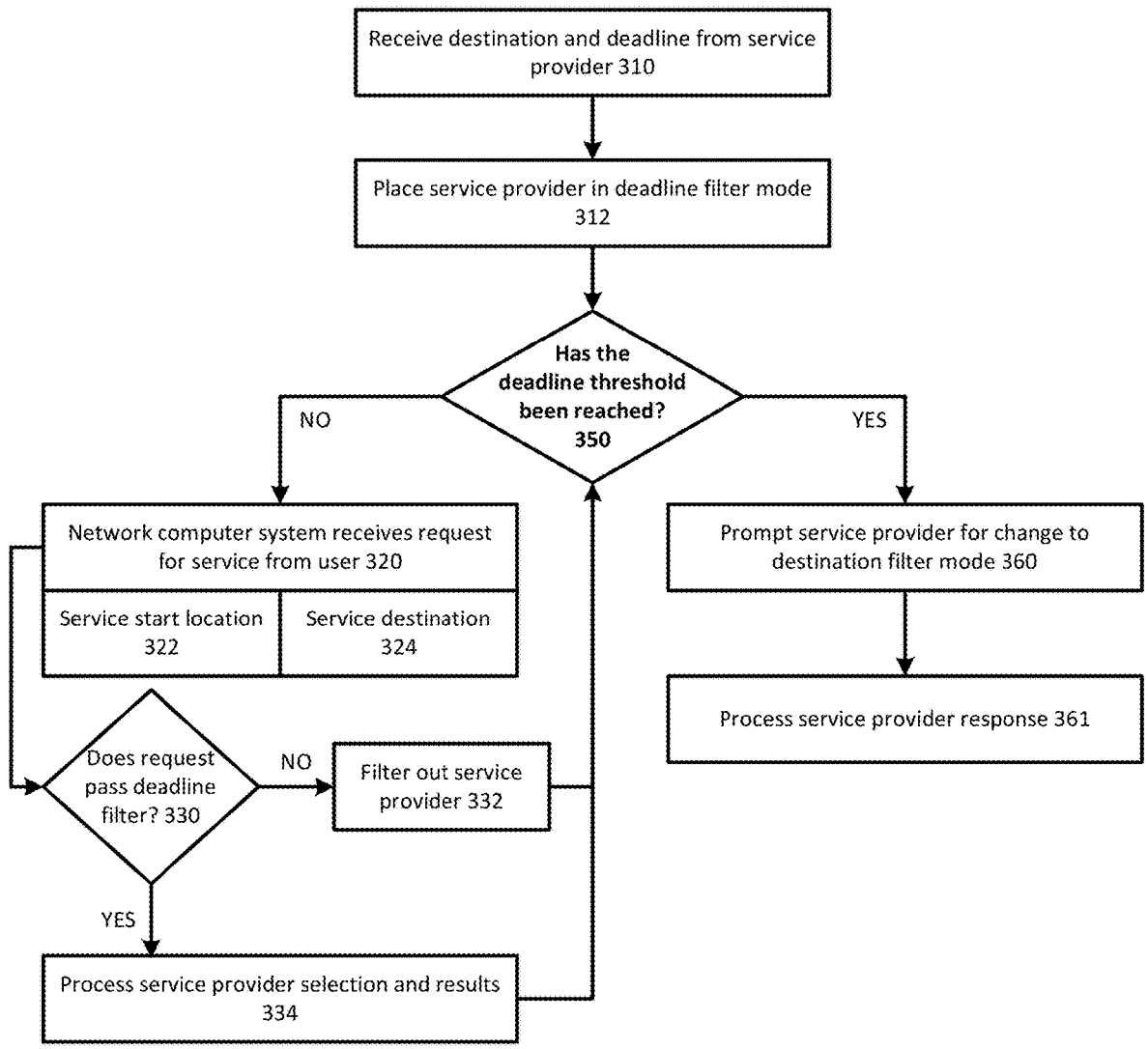
FIG. 3 is a flow chart describing an example method of filtering service requests by destination and deadline, according to examples described herein.
Figure 4:
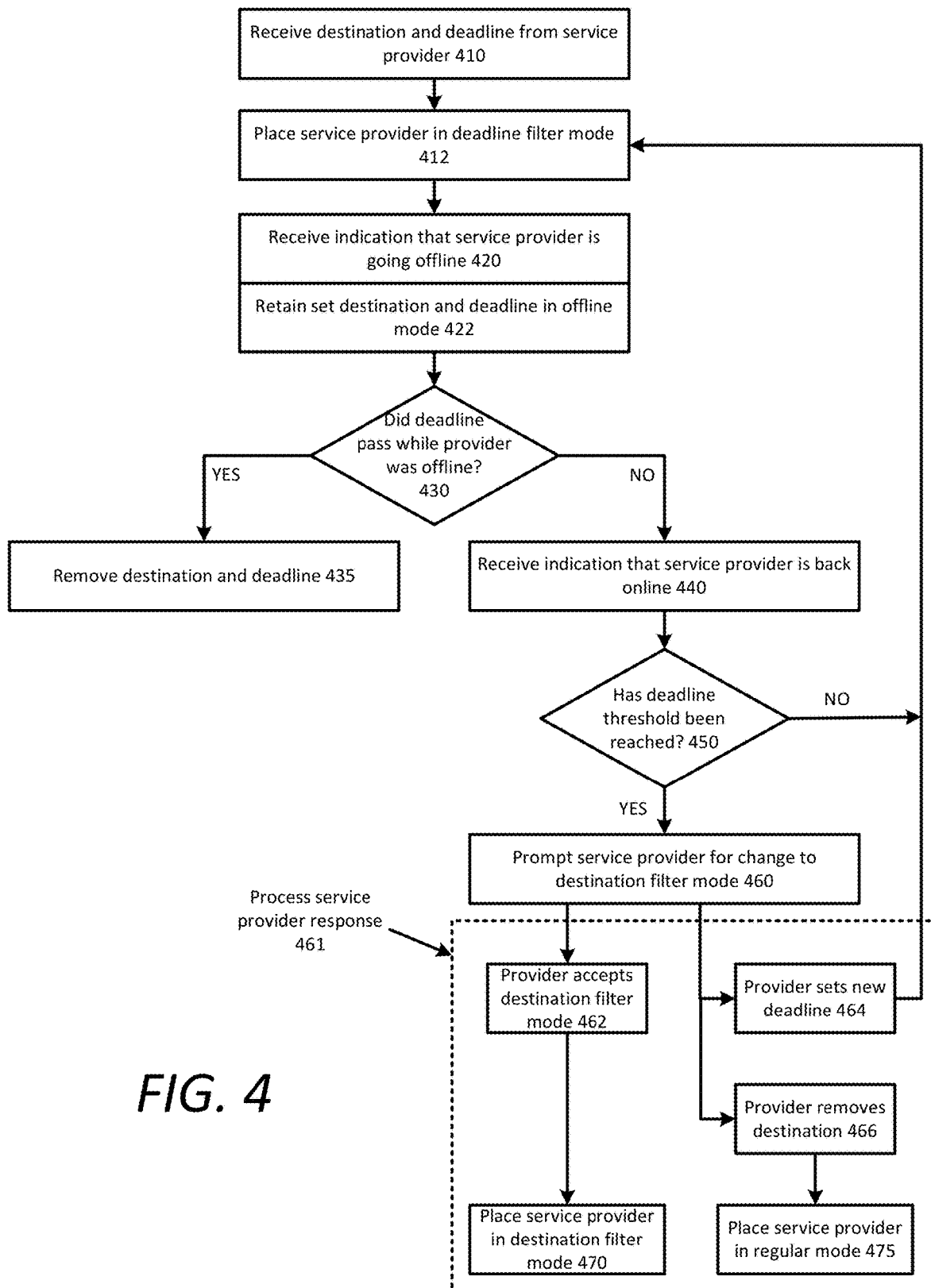
FIG. 4 is a flow chart describing an example method of persisting destination and deadline settings when a service provider goes offline, according to examples described herein.
Figure 5:
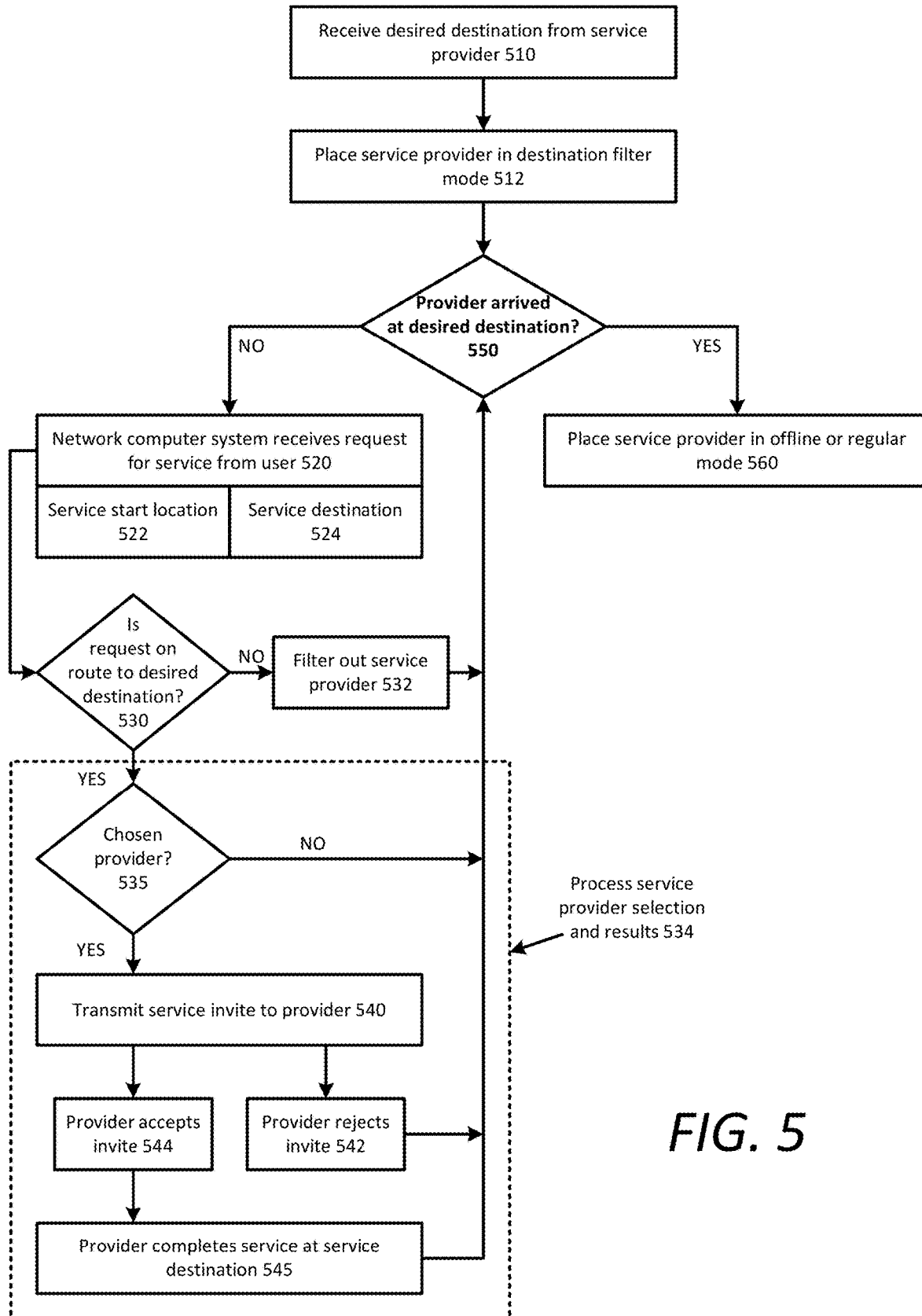
FIG. 5 is a flow chart describing an example method of filtering service requests by destination, according to examples described herein.

FIGS. 3 through 5 are flow charts describing example methods used in filtering service requests by destination and deadline. While operations of the methods are described below as being performed by specific components of the network computer system 100, it will be appreciated that these operations need not necessarily be performed by the specific components identified, and could be performed by a variety of components and modules, potentially distributed over a number of machines. Accordingly, references may be made to elements of the network computer system 100 for the purpose of illustrating suitable components or elements for performing a step or sub step being described. Alternatively, at least certain ones of the variety of components and modules described in the network computer system 100 can be arranged within a single hardware, software, or firmware component. It will also be appreciated that some of the steps of these methods may be performed in parallel or in a different order than illustrated.

FIG. 3 is a flow chart describing an example method of filtering service requests by destination and deadline, according to examples described herein. The network computer system 100 can receive a destination and a deadline from a service provider that specify what time the service provider would like to stop providing service and where that service provider would like to be at that time (310). For example, a driver could select that he or she wants to be home at 7 p.m. In this example, the destination is the provider's home address and the deadline is 7 p.m.

A provider management interface 115 of the network computer system 100 can process the destination and deadline request and update the mode assigned to the service provider to reflect the received destination and deadline. In some aspects, the provider management interface 115 can verify the destination and any constraints on the minimum and maximum acceptable deadlines to confirm the validity of the request. The provider management interface 115 can also determine whether the service provider meets any necessary conditions to activate the deadline filter mode. For example, features of the deadline filter mode, such as the ability to specify a destination, may be limited in frequency of use. Once verified, the provider management interface 115 can place the service provider in the deadline filter mode (312). In this mode, the network computer system 100 attempts to ensure that the service provider does not receive service invitations that would take the provider too far away from the destination such that he or she would be unable to reach the desired destination by the deadline.

In order to ensure that the service provider can reach the desired destination by the deadline, the network computer system 100 tracks the current location of the service provider and estimates how long it should take the service provider to reach the destination while providing services to requesting users along the way. At periodic intervals while the service provider is in deadline filter mode, such as every time the current location of the service provider changes or once per minute, the network computer system 100 adds the estimate to the current time and compares that to the deadline to determine whether the deadline threshold has been reached (350).

The estimate of how long it should take the service provider to reach the destination includes estimates for the time it would take to get to the destination if the service provider went there directly from the current location plus any time spent providing services to requesting users along the way. In one aspect, the network computer system 100 can implement a destination filter mode that offers service providers only the service requests that the provider can fulfill along the way to the specified destination. In an example where the service provider is a driver offering transport services, the time spent providing services can account for expected delays that arise through taking a detour to pick riders up and drop them off as well as expected wait times for riders to get in and out of the car. This time can be expressed as the expected_time_to_arrival_with_destination_filter. One example estimate for that time is:

$$direct\_time\_to\_destination\_from\_current\_location*1.5+20 \text{ minutes}$$

The direct_time_to_destination_from_current_location is estimated from mapping resources, such as the mapping engine 135, and the constants are configurable. The multiplier accounts for the fact that a longer distance tends to yield more intermittent service requests. The offset ensures enough buffer time when the destination is nearby. In other aspects, historical data collected from service providers in the destination filter mode are used to estimate the expected_time_to_arrival_with_destination_filter.

As soon as the calculated duration is equal to or greater than the time left until the deadline the service provider set, the network computer system 100 informs the service provider that it is time to head to the destination through a prompt displayed on the service provider device 180 (360). If the service provider is currently providing service to a user when the network computer system 100 determines that it is time to head towards the destination, the service provider application 185 can wait until the service is completed and then inform the service provider that he or she should head to the destination.

In response to the prompt to head to the destination, the service provider can choose to enter destination filter mode, set a new deadline, or remove the deadline entirely (e.g., by providing input). The network computer system 100 can then process the service provider response to the prompt (361). If the service provider chooses to enter destination filter mode, the network computer system 100 sets the service provider mode and expects the provider to travel towards the destination. From then on, the network computer system 100 offers the service provider only service invitations that are on the route from the current location to the destination. Therefore, in destination filter mode, the invites offered to the service provider should not take the service provider too far away from the route such that he or she cannot make it to the destination prior to the deadline. In some aspects, the service provider can configure destination filter mode settings so that service invitations can cause the deadline to be exceeded by a fudge factor (e.g., 5 minutes). Additionally, while in destination filter mode, the service provider can receive preferential treatment (i.e., boosting) from the network computer system 100 and is considered higher priority than providers in normal mode for service invitations that are along the route.

Prior to the deadline threshold being reached, the network computer system 100 offers the service provider service invitations without any restrictions on direction. However, the offered service invitations are constrained by a deadline filter that checks whether the service provider has time to fulfill the service invitation and still reach the destination while providing services to requesting users along the way. Therefore, when the network computer system 100 receives a service request from a user (320), the network computer system 100 estimates the time required for the service provider to travel from the current location to the service start location (322), the service start location to the service destination (324), and the service destination to the desired destination. In an example, the user is a prospective passenger that wants to be picked up at the service start location and dropped off at the service destination.

In order to determine whether a received service request passes the deadline filter, the network computer system 100 can calculate an expected time for the service provider to complete the service request. In one example, the expected time at completion is the current time plus an estimate for the time to travel from the current location to the service start location and then from the service start location to the service destination, taking into account factors such as traffic conditions and time required at each location to perform aspects of the service. The deadline filter can additionally estimate how long it should take the service provider to travel from the service destination to the desired destination while still accepting and fulfilling service requests along the way to the desired destination, expressed as the expected_time_to_arrival_with_destination_filter. One example estimate for that time is:

$$direct\_time\_to\_destination\_from\_service\_destination*1.5+20 \text{ minutes}$$

As with the deadline threshold, the deadline filter calculation can estimate direct_time_to_destination_from_service_destination from mapping resources, such as the mapping engine 135, and the constants are configurable. The multiplier accounts for the fact that a longer distance tends to yield more intermittent service requests. The offset ensures enough buffer time when the destination is nearby. In other aspects, historical data collected from service providers in the destination filter mode are used to estimate the expected_time_to_arrival_with_destination_filter.

The deadline filter then adds the expected time at the service destination and the expected_time_to_arrival_with_destination_filter and compares the result to the deadline. If the result is on or before the deadline, the request passes the destination filter and the service provider is a possible candidate for fulfilling the service request (330). If the result is after the deadline, the network computer system 100 filters out the service provider from a candidate set of providers and instead chooses a different provider from the candidate set to fulfill the service request (332). In alternative implementations, the network computer system 100 can instead choose an optimal service provider from the candidate set of providers prior to checking whether the request passes any filters. In this case, if the chosen optimal service provider is in deadline filter mode, the network computer system 100 then checks whether the request passes the deadline filter, and if not, chooses the next available service provider. In another example, when the network computer system receives a service request, the network computer system can identify a set of candidate providers based on their locations and the start location of the service request. If the set of candidate providers includes a service provider in the deadline filter mode, the network computer system can determine, based on the computations described, whether that service provider should be included in the set of candidate providers. If that service provider is included in the set, the network computer system can perform a default selection process to select a service provider from this set or select that service provider (e.g., given a boost), depending on implementation.

If the service provider is chosen to fulfill the service request, the network computer system 100 sends a service invitation to the provider, who may accept or reject it. Whether the service provider accepts and performs the service or rejects the invite, the network computer system 100 processes the service provider selection and any results (334). When the service provider is available to receive a new service invitation, the network computer system 100 can resume monitoring whether the deadline threshold has been reached (350).

In some aspects, the network computer system 100 can continue monitoring the deadline threshold while the service provider is fulfilling a service request. If the service provider is currently providing service to a user when the network computer system 100 determines that it is time to head towards the destination, the service provider application 185 can wait until the service is completed and then inform the service provider that he or she should head to the destination. Since the request for the current service being performed passed the deadline filter, this can happen only in situations where traffic conditions on the route worsen significantly or other aspects of the service request take significantly longer than estimated.

FIG. 4 is a flow chart describing an example method of persisting destination and deadline settings when a service provider goes offline, according to examples described herein. The network computer system 100 can receive a destination and a deadline from a service provider that specify what time the service provider would like to stop providing service and where that service provider would like to be at that time (410). For example, a driver could select that he or she wants to be at a restaurant at 7 p.m. In this example, the destination is the restaurant specified by the service provider and the deadline is 7 p.m.

A provider management interface 115 of the network computer system 100 can process the destination and deadline request and update the mode assigned to the service provider to reflect the received destination and deadline. In some aspects, the provider management interface 115 can verify the destination and any constraints on the minimum and maximum acceptable deadlines to confirm the validity of the request. The provider management interface 115 can also determine whether the service provider meets any necessary conditions to activate the deadline filter mode. For example, features of the deadline filter mode, such as the ability to specify a destination, may be limited in frequency of use. Once verified, the provider management interface 115 can place the service provider in the deadline filter mode (412). In this mode, the network computer system 100 attempts to ensure that the service provider does not receive service invitations that would take the provider too far away from the destination such that he or she would be unable to reach the desired destination by the deadline.

In some aspects, a service provider can switch to an offline mode in which he or she is not available for receiving service invitations (420). For example, the service provider may go offline at the end of a planned shift or the end of the day. In other examples, the service provider takes a short break with the intention to resume accepting service invitations after the break. When a service provider in deadline filter mode goes offline, the network computer system 100 can retain the destination and deadline settings so that the service provider can resume operating in deadline filter mode when he or she comes back online.

In one implementation, the service provider application 185 or another background process on the service provider device 180 can continually monitor whether the deadline passes or expires while the service provider is offline (430). If the deadline passes, the service provider application 185 can remove the destination and deadline settings and update the network computer system 100 accordingly. In an alternate implementation, the network computer system 100 can continue to monitor the deadline even when the service provider is offline. If the deadline passes, the network computer system 100 can remove the destination and deadline settings from the provider data 190 (435).

Once the service provider chooses to resume receiving service requests through the service provider application 185, the network computer system 100 receives an indication that the provider is back online (440). In order to ensure that the service provider can reach the desired destination by the deadline, the network computer system 100 checks the current location of the service provider and estimates how long it should take the service provider to reach the destination while providing services to requesting users along the way. The network computer system 100 adds the estimate to the current time and compares that to the deadline to determine whether the deadline threshold has been reached (450).

The estimate of how long it should take the service provider to reach the destination includes estimates for the time it would take to get to the destination if the service provider went there directly from the current location plus any time spent providing services to requesting users along the way. In one aspect, the network computer system 100 can implement a destination filter mode that offers service providers only the service requests that the provider can fulfill along the way to the specified destination. In an example where the service provider is a driver, the time spent providing services can account for expected delays that arise through taking a detour to pick riders up and drop them off as well as expected wait times for riders to get in and out of the car. This time can be expressed as the expected_time_to_arrival_with_destination_filter. One example estimate for that time is:

direct_time_to_destination_from_current_location*1.5+20 minutes

The direct_time_to_destination_from_current_location is estimated from mapping resources, such as the mapping engine 135, and the constants are configurable. The multiplier accounts for the fact that a longer distance tends to yield more intermittent service requests. The offset ensures enough buffer time when the destination is nearby. In other aspects, historical data collected from service providers in the destination filter mode are used to estimate the expected_time_to_arrival_with_destination_filter.

As soon as the calculated duration is equal to or greater than the time left until the deadline the service provider set, the network computer system 100 informs the service provider that it is time to head to the destination through a prompt displayed on the service provider device 180 (460). In some implementations, the network computer system 100 can continue to monitor the current location of the service provider and determine whether the deadline threshold has been reached even while the provider is offline. If so, the network computer system 100 can prompt the offline service provider to begin heading towards the destination and/or come online and change to destination filter mode in order to reach the destination by the deadline.

In one implementation, the prompt generated in response to the deadline threshold being reached is a modal window displayed through the service provider application 185. This modal window can give the service provider three options.

In a first option, the service provider can choose to enter destination filter mode (462). The network computer system 100 places the provider in destination filter mode and begins filtering service invitations to only those that are on the route between the service provider's current location and the set destination (470). Upon choosing this option, the service provider application 185 can also display information related to the destination filter mode such as special conditions that may apply in that mode.

In a second option, the service provider can choose to delay entering destination filter mode and remain in deadline filter mode for longer by setting a new, later deadline (464).

In a third option, the service provider can choose to cancel the deadline and remove the destination (466). With this option, the provider is no longer in deadline filter mode and does not enter destination filter mode. Instead, the network computer system 100 places the service provider in regular mode indicating a normal online status (475).

FIG. 5 is a flow chart describing an example method of filtering service requests by destination, according to examples described herein. In one aspect, the network computer system 100 can receive a destination from a service provider that specifies where the provider is traveling (510). In another aspect, the network computer system 100 has a stored destination for a service provider who is in deadline filter mode. Once the deadline threshold for the deadline filter mode is reached, the network computer system 100 can transition the service provider into destination filter mode. For example, a driver can set a home address as the destination when the driver is headed home.

A provider management interface 115 of the network computer system 100 can process the destination request and update the mode assigned to the service provider to reflect the destination. In some aspects, the provider management interface 115 can verify the destination and any constraints on the destination to confirm the validity of the request. The provider management interface 115 can also determine whether the service provider meets any necessary conditions to activate the destination filter mode. For example, features of the destination filter mode may be limited in frequency of use. Once verified, the provider management interface 115 can place the service provider in the destination filter mode (512).

Prior to reaching the destination, the network computer system 100 filters out service requests so that the provider is only offered service invitations that are along the route from the provider's current location to the destination. Therefore, when the network computer system 100 receives a service request from a user (520), the network computer system 100 checks the service start location (522) and service destination (524) and determines whether paths from the provider's current location to the service start location and service destination are near or along the route from the current location to the desired destination (530). In one example, the user is a prospective passenger that wants to be picked up at the service start location and dropped off at the service destination. If the service start location and service destination are not near or along the provider's route from the current location to the desired destination (e.g., the service start location and/or service destination are not within a threshold distance from a point along the route of travel), the network computer system 100 filters out the service provider from a candidate pool of providers and instead chooses a different provider from the candidate pool to fulfill the service request (532). On the other hand, if the service start location and service destination are near or along the provider's route from the current location to the desired destination, the service provider is a viable candidate for fulfilling the service request, and the network computer system 100 can proceed to process service provider selection and results (534).

The network computer system 100 can utilize the current locations of the service providers in a region in order to choose an optimal service provider to fulfill the service request (535). As provided herein, the optimal service provider can be a service provider that is closest to the service requester with respect to distance or time, or can be a proximate service provider that is optimal for other reasons, such as the service provider's experience, the amount of time the service provider has been on the clock, the service provider's current earnings, and the like. In some implementations, the network computer system 100 can prioritize service providers in destination filter mode for service requests that are near or along the provider's route from the current location to the desired destination.

Once the optimal service provider is selected, the network computer system 100 can generate a service invitation to fulfill the service request and transmit the service invitation to the optimal service provider's device via the service provider application 185 (540). Upon receiving the service invitation, the optimal service provider can either accept or reject the invitation. Rejection of the invitation can cause the network computer system 100 to select a next available service provider from the candidate set of service providers to fulfill the service request (542). However, if the optimal service provider accepts (e.g., via an acceptance input on a user interface of the service provider application 185), then the acceptance input can be transmitted back to the network computer system 100, which can generate and transmit information identifying the optimal service provider to the service requester via the service requester application 175 on the service requester device 170 (544). The service provider then fulfills the service request at the service start location and/or service destination (545). In an example using transport services, the service provider picks up the service requester at the service start location and drops off the service requester at the service destination.

When the service provider is available to receive a new service invitation (either through rejecting an invitation or completing service), the network computer system 100 or the service provider device 180 itself can resume monitoring and checking the service provider location to determine if the provider has arrived at the desired destination (550). Once the provider has arrived at the desired destination, the service provider application 185 can place the service provider in an offline mode wherein the provider is not available to receive service invitations (560). Alternatively, the service provider application 185 can prompt the provider to choose whether to go offline or return to a regular service mode.

User Interface Examples

Figure 6A:
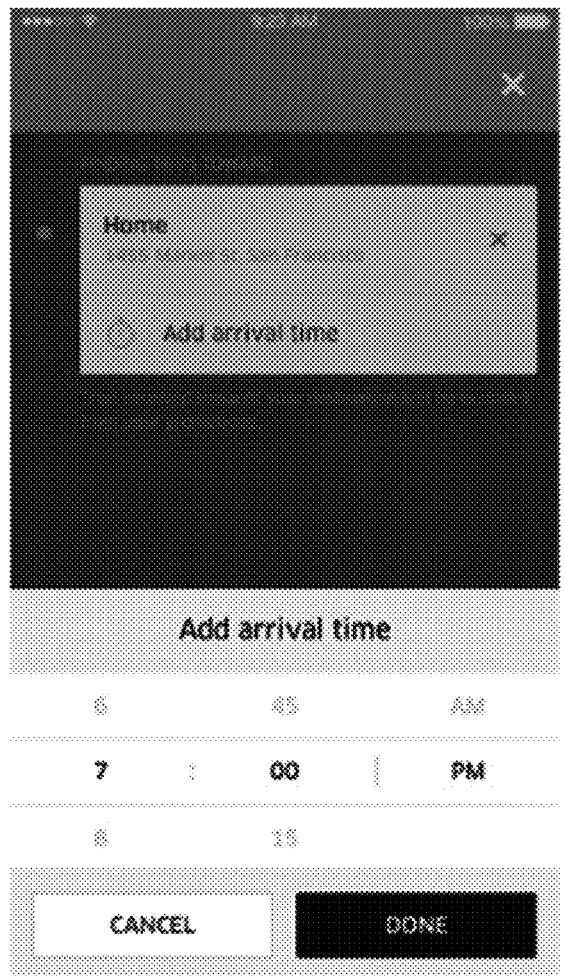
FIGS. 6A and 6B illustrate example user interfaces on a service provider device, according to examples described herein.
Figure 6B:
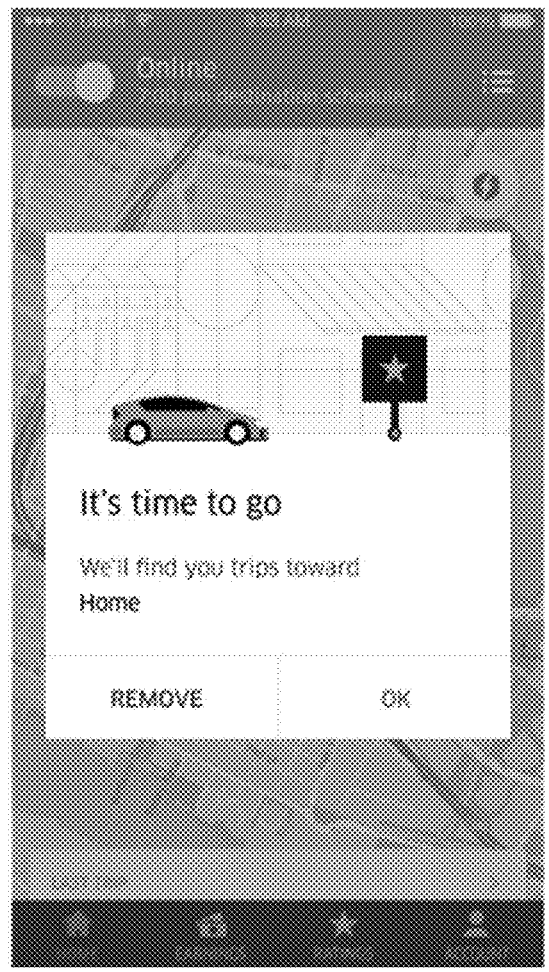

FIGS. 6A and 6B illustrate example user interfaces on a service provider device, according to examples described herein. In one example, execution of the service provider application 185 on the service provider device 180 can cause the device to generate an application interface on the device's touch-sensitive display.

In the example user interface illustrated in FIG. 6A, a service provider can enter deadline filtering mode by choosing a destination and a deadline that specify what time the service provider would like to stop providing service and where that service provider would like to be at that time (e.g., by providing input). For example, a driver providing transport services could select that he or she wants to be home at 7 p.m. In this example, the destination is the provider's home address and the deadline is 7 p.m. Once in deadline filtering mode, the network computer system 100 attempts to ensure that the service provider does not receive service invitations that would take the provider too far away from the destination such that he or she would be unable to reach the desired destination by the deadline.

In one implementation, when not currently providing service to a user, the service provider can select a menu icon on the service provider application 185 to request deadline filtering mode. In response, the service provider application 185 can display the interface shown in FIG. 6A to allow the provider to set a destination and a deadline. The service provider can choose the destination from saved locations or search for a new address to use as the destination. The nearest selectable deadline, or arrival time, that the service provider is allowed to select is the soonest time such that the network computer system 100 is confident that it can route the service provider from the current location to the destination in time while the service provider fulfills service requests along the way. In addition, the user interface can limit the latest selectable arrival time to a longest reasonable length of a shift (e.g., 12 hours). Once the service provider selects a destination and a deadline, the provider can press the DONE button to transmit the request to the network computer system 100.

In some aspects, the network computer system 100 can verify the destination and any constraints on the minimum and maximum acceptable deadlines to confirm the validity of the request. The network computer system 100 can also determine whether the service provider meets any necessary conditions to activate the deadline filter mode. For example, features of the deadline filter mode, such as the ability to specify a destination, may be limited in frequency of use. Once verified, the network computer system 100 can place the service provider in the deadline filter mode.

FIG. 6B illustrates an example modal window displayed when the deadline threshold has been reached. In order to ensure that the service provider can reach the desired destination by the deadline, the network computer system 100 tracks the current location of the service provider and estimates how long it should take the service provider to reach the selected destination while providing services to requesting users along the way. At periodic intervals while the service provider is in deadline filter mode, such as every time the current location of the service provider changes or once per minute, the network computer system 100 adds the estimate to the current time and compares that to the deadline to determine whether the deadline threshold has been reached.

As soon as the deadline threshold is reached, the network computer system 100 informs the service provider that it is time to head to the destination through a prompt displayed on the service provider device 180 through the service provider application 185. If the service provider is currently providing service to a user when the network computer system 100 determines that it is time to head towards the destination, the service provider application 185 can wait until the service is completed and then inform the service provider that he or she should head to the destination.

When presented with the modal window shown in FIG. 6B, the service provider can choose to enter destination filter mode by selecting OK. From then on, the network computer system 100 offers the service provider only service invitations that are on the route from the current location to the destination. Therefore, in destination filter mode, the invites offered to the service provider should not take the service provider too far away from the route such that he or she cannot make it to the destination prior to the deadline. Alternatively, the service provider can select REMOVE to ignore the deadline and return to a normal online status mode. In a further alternative not illustrated, the service provider can choose a new deadline using an interface such as the one illustrated in FIG. 6A.

In some aspects, the user interface of the service provider application 185 can display an indication to the service provider that the provider is in deadline filter mode. This indication can also include the selected deadline. For example, the top portion of the user interface can display that the provider is online and that he or she has a "7:00 p.m. destination scheduled." Furthermore, when the service provider is offline, the user interface can retain the deadline and continue to display the deadline in the illustrated status bar. In addition, a map displayed as part of the user interface can indicate the selected destination with an icon such as a star at the destination.

Service Provider Device

Figure 7:
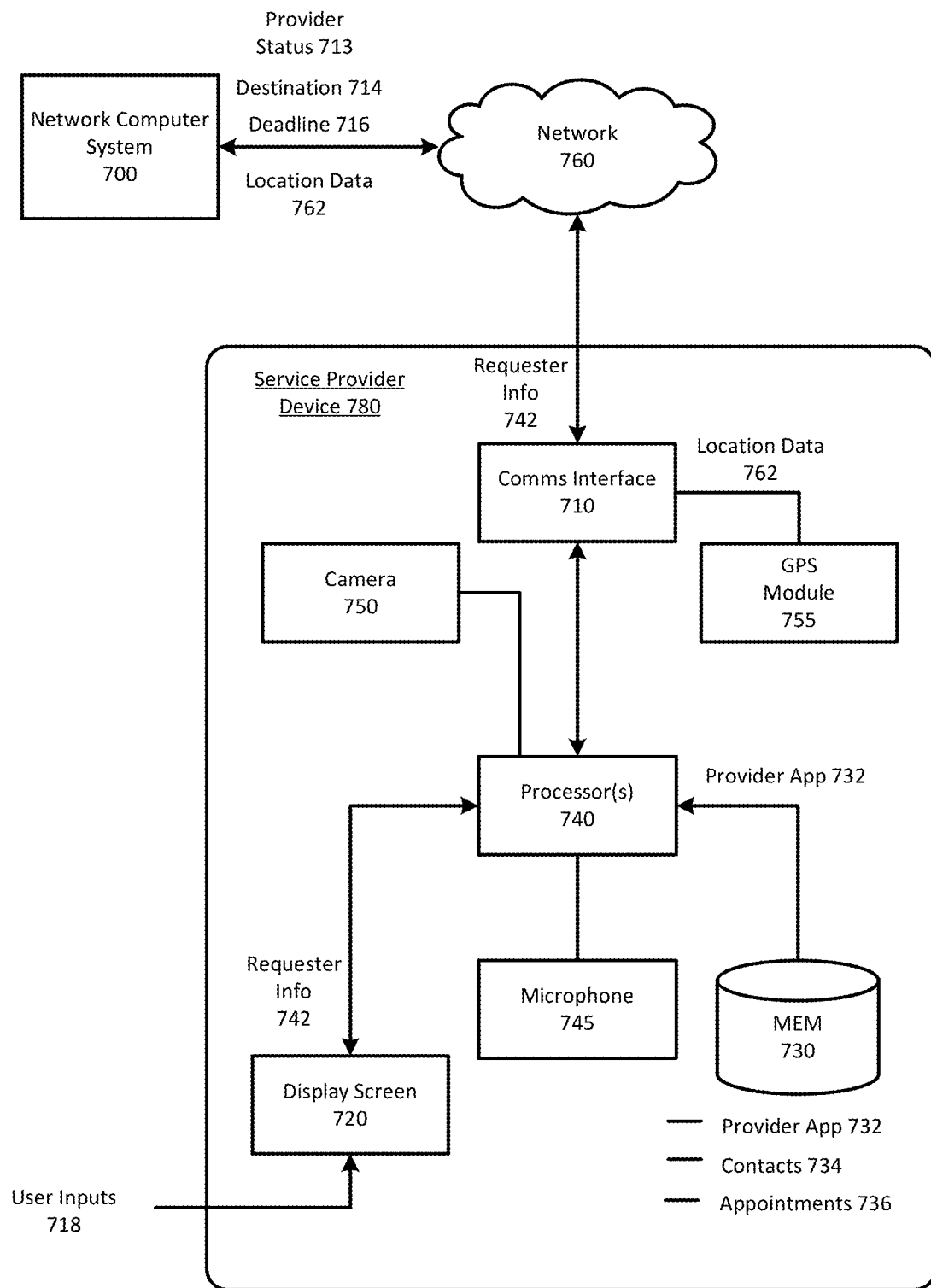
FIG. 7 is a block diagram illustrating an example service provider device executing a designated service provider application for an on-demand service, as described herein.

FIG. 7 is a block diagram illustrating an example service provider device executing a designated service provider application for an on-demand service, as described herein. In many implementations, the service provider device 780 can comprise a mobile computing device, such as a smartphone, tablet computer, laptop computer, VR or AR headset device, and the like. As such, the service provider device 780 can include typical telephony features such as a microphone 745, a camera 750, and a communication interface 710 to communicate with external entities using any number of wireless communication protocols. In certain aspects, the service provider device 780 can store a designated application (e.g., a service provider application 732) in a local memory 730. In many aspects, the service provider device 780 further stores information corresponding to a contacts list 734 and calendar appointments 736 in the local memory 730. In variations, the memory 730 can store additional applications executable by one or more processors 740 of the service provider device 780, enabling access and interaction with one or more host servers over one or more networks 760.

In response to a user input 718, the service provider application 732 can be executed by a processor 740, which can cause an application interface to be generated on a display screen 720 of the service provider device 780. The application interface can enable the service provider to, for example, check current price levels and availability for the on-demand arrangement service. In various implementations, the application interface can further enable the service provider to select from multiple ride service types, such as a carpooling service type, a regular ride-sharing service type, a professional ride service type, a van on-demand service type, a luxurious ride service type, and the like.

The provider can enter various states or modes, such as online mode, destination filter mode, and deadline filter mode via user inputs 718 provided on the application interface. For example, the provider can select which types of service he or she is available to provide as well as a desired destination 714 and deadline 716 to be at that destination. As provided herein, the service provider application 732 can further enable a communication link with a network computer system 700 over the network 760, such as the network computer system 100 as shown and described with respect to FIG. 1. Furthermore, as discussed herein, the service provider application 732 can display requester information 742 on the application interface that includes data regarding a service requester so that the provider can choose whether to accept or reject a service invitation received from the network computer system 700.

The processor 740 can transmit the provider status 713 (i.e., modes the provider is in) via a communications interface 710 to the backend network computer system 700 over a network 760. In various examples, the service provider device 780 can further include a GPS module 755, which can provide location data 762 indicating the current location of the provider to the network computer system 700 to, for example, select an optimal service provider or filter the provider based on destination 714 and deadline 716. In alternative aspects, hard-wired circuitry may be used in place of or in combination with software instructions to implement aspects described herein. Thus, aspects described are not limited to any specific combination of hardware circuitry and software.

Hardware Diagram

Figure 8:
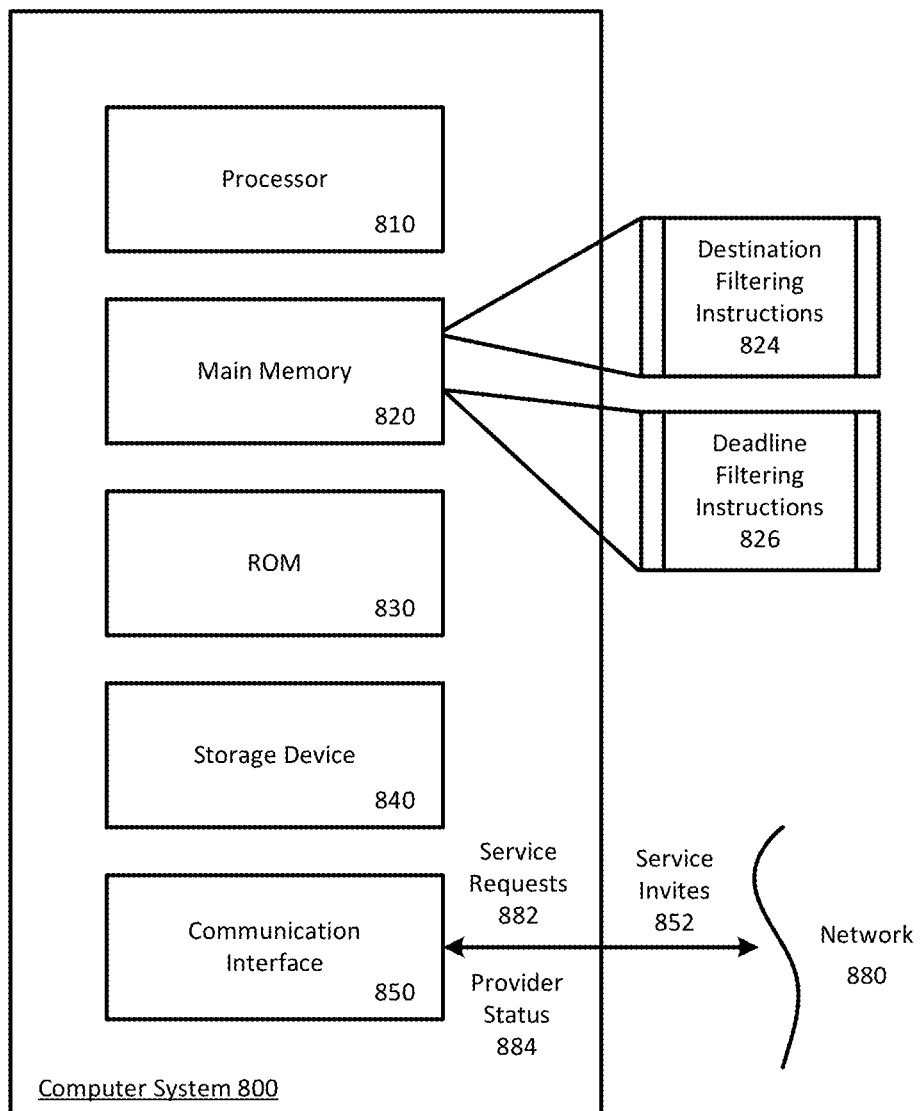
FIG. 8 is a block diagram that illustrates a computer system upon which aspects described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network service for providing service services. In the context of FIG. 1, the network computer system 800 may be implemented using a computer system 800 such as described by FIG. 8. The network computer system 100 may also be implemented using a combination of multiple computer systems as described in connection with FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate with one or more networks 880 (e.g., cellular network) through use of the network link (wireless or wired). Using the network link, the computer system 800 can communicate with one or more computing devices, one or more servers, and/or one or more self-driving vehicles. In accordance with examples, the computer system 800 receives service requests 882 from mobile computing devices of individual users. The executable instructions stored in the memory 830 can destination filtering instructions 824 and deadline filtering instructions 826, which the processor 810 executes to determine whether to filter a service provider based on destination and/or deadline. In doing so, the computer system can receive a provider status 884 for service providers operating throughout the given region, and the processor can select an optimal service provider from a set of available service providers and transmit a service invitation 852 to enable the service provider to accept or decline the service offer.

By way of example, the instructions and data stored in the memory 820 can be executed by the processor 810 to implement an example network computer system 100 of FIG. 1. In performing the operations, the processor 810 can receive service requests 882 and provider status 884 and submit service invitations 852 to facilitate fulfilling the service requests 882.

The processor 810 is configured with software and/or other logic to perform one or more processes, steps and other functions described with implementations, such as described by FIGS. 1 through 6, and elsewhere in the present application.

Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network computer system comprising:
one or more processors;
a memory to store a set of instructions;
wherein the one or more processors execute the set of instructions to perform operations comprising:
implementing each of (i) a provider management interface that communicates, over one or more networks, with provider devices of one or more service providers, (ii) a requester interface to communicate, over one or more networks, with one or more service requester devices to receive a plurality of service requests, and (iii) one or more selection processes for selecting one of the service providers for each service request of the plurality of service requests;
communicating, using the provider management interface, with a provider device of a service provider to receive provider data, the provider data identifying each of (i) a current location of the service provider through a location-based resource of the provider device, and (ii) a selection of a deadline filter mode by the service provider, the selection of the deadline filter mode indicating a provider-specified destination and a deadline time;
tracking the current location of the service provider by periodically communicating with the provider device using the provider management interface;
determining whether to implement a deadline filter mode for the service provider based at least in part on the provider-specified destination, the deadline time and the current location of the service provider;
in response to determining to implement the deadline filter mode for service the provider, causing the provider device to display a prompt to head towards the provider-specified destination;
while the service provider is in the deadline filter mode, using a mapping engine to repeatedly estimate a duration for the service provider to reach the provider-specified destination while providing services to requesters along the way, including updating the estimate based on the current location of the service provider;
selecting a service request of a plurality of service requests to the service provider by estimating a duration for the service provider to provide a transport service for the selected service request;
wherein estimating the duration for the service provider to provide the transport service for the selected service request includes utilizing map data, determined from a mapping engine, to calculate an estimated travel time for the service provider to travel from the current location to a service start location of the service request, an estimated travel time for the service provider to travel from the service start location to a service destination of the service request, and an estimated travel time for the service provider to travel from the service destination to the provider-specified destination;
wherein estimating the duration is further based at least in part on the map data and traffic conditions provided by the mapping engine or service; and
transmitting, over one or more networks, information about the selected service request to the provider device.

2. The network computer system of claim 1, wherein estimating the duration is based at least in part on an estimated additional time associated with at least one of the service provider performing a first aspect of the transport service at the service start location or the service provider performing a second aspect of the transport service at the service destination.

3. The network computer system of claim 1, wherein estimating the duration for the service provider is based at least in part on an estimated travel time for the service provider to travel from the service destination of the service request to the provider-specified destination.

4. The network computer system of claim 1, wherein the operations further comprise:
while implementing the deadline filter mode, filtering out a service request based on a direction of travel required for the service request.

5. The network computer system of claim 4, wherein filtering out the service request based on the direction of travel required for the service request includes:
determining a service start location and a service destination for the service request; and
determining that the service start location or the service destination are not within a threshold distance of a point along a route of travel of the service provider.

6. The network computer system of claim 1, wherein transmitting information about the selected service request includes transmitting an invitation to the provider device, the invitation including information about the selected service request.

7. The network computer system of claim 1, wherein selecting the service request includes determining that fulfilling the service request would cause the service provider to arrive at the provider-specified destination an acceptable time after the deadline time.

8. A non-transitory computer-readable medium that stores instructions, which when executed by one or more processors of a computer system, cause the computer system to perform operations comprising:
implementing each of (i) a provider management interface that communicates, over one or more networks, with provider devices of one or more service providers, (ii) a requester interface to communicate, over one or more networks, with one or more service requester devices to receive a plurality of service requests, and (iii) one or more selection processes for selecting one of the service providers for each service request of the plurality of service requests;
communicating, using the provider management interface, with a provider device of a service provider to receive provider data, the provider data identifying each of (i) a current location of the service provider through a location-based resource of the provider device, and (ii) a selection of a deadline filter mode by the service provider, the selection of the deadline filter mode indicating a provider-specified destination and a deadline time;

tracking the current location of the service provider by periodically communicating with the provider device using the provider management interface;

determining whether to implement a deadline filter mode for the service provider based at least in part on the provider-specified destination, the deadline time and the current location of the service provider;

in response to determining to implement the deadline filter mode for the service provider, causing the provider device to display a prompt to head towards the provider-specified destination;

while the service provider is in the deadline filter mode, using a mapping engine to repeatedly estimate a duration for the service provider to reach the provider-specified destination while providing services to requesters along the way, including updating the estimate based on the current location of the service provider;

selecting a service request of a plurality of service requests to the service provider by estimating a duration for the service provider to provide a transport service for the selected service request;

wherein estimating the duration for the service provider to provide the transport service for the selected service request includes utilizing map data, determined from a mapping engine, to calculate an estimated travel time for the service provider to travel from the current location to a service start location of the service request, an estimated travel time for the service provider to travel from the service start location to a service destination of the service request, and an estimated travel time for the service provider to travel from the service destination to the provider-specified destination;

wherein estimating the duration is further based at least in part on the map data and traffic conditions provided by the mapping engine or service; and transmitting, over one or more networks, information about the selected service request to the provider device.

9. The non-transitory computer-readable medium of claim 8, wherein estimating the duration is based at least in part on an estimated additional time associated with at least one of the service provider performing a first aspect of the transport service at the service start location or the service provider performing a second aspect of the transport service at the service destination.

10. The non-transitory computer-readable medium of claim 8, wherein estimating the duration for the service provider is based at least in part on an estimated travel time for the service provider to travel from the service destination of the service request to the provider-specified destination.

11. The non-transitory computer-readable medium of claim 8, wherein the operations further comprise:

while implementing the deadline filter mode, filtering out a service request based on a direction of travel required for the service request.

12. The non-transitory computer-readable medium of claim 11, wherein filtering out the service request based on the direction of travel required for the service request includes:

determining a service start location and a service destination for the service request; and determining that the service start location or the service destination are not within a threshold distance of a point along a route of travel of the service provider.

13. The non-transitory computer-readable medium of claim 8, wherein transmitting information about the selected service request includes transmitting an invitation to the provider device, the invitation including information about the selected service request.

14. The non-transitory computer-readable medium of claim 8, wherein selecting the service request includes determining that fulfilling the service request would cause the service provider to arrive at the provider-specified destination an acceptable time after the deadline time.

15. A computer-implemented method comprising:

implementing each of (i) a provider management interface that communicates, over one or more networks, with provider devices of one or more service providers, (ii) a requester interface to communicate, over one or more networks, with one or more service requester devices to receive a plurality of service requests, and (iii) one or more selection processes for selecting one of the service providers for each service request of the plurality of service requests;

communicating, using the provider management interface, with a provider device of a service provider to receive provider data, the provider data identifying each of (i) a current location of the service provider through a location-based resource of the provider device, and (ii) a selection of a deadline filter mode by the service provider, the selection of the deadline filter mode indicating a provider-specified destination and a deadline time;

tracking the current location of the service provider by periodically communicating with the provider device using the provider management interface;

determining whether to implement a deadline filter mode for the service provider based at least in part on the provider-specified destination, the deadline time and the current location of the service provider;

in response to determining to implement the deadline filter mode for the service provider, causing the provider device to display a prompt to head towards the provider-specified destination;

while the service provider is in the deadline filter mode, using a mapping engine to repeatedly estimate a duration for the service provider to reach the provider-specified destination while providing services to requesters along the way, including updating the estimate based on the current location of the service provider;

selecting a service request of a plurality of service requests to the service provider by estimating a duration for the service provider to provide a transport service for the selected service request;

wherein estimating the duration for the service provider to provide the transport service for the selected service request includes utilizing map data, determined from a mapping engine, to calculate an estimated travel time for the service provider to travel from the current location to a service start location of the service request, an estimated travel time for the service provider to travel from the service start location to a service destination of the service request, and an estimated travel time for the service provider to travel from the service destination to the provider-specified destination;

wherein estimating the duration is further based at least in part on the map data and traffic conditions provided by the mapping engine or service; and transmitting, over one or more networks, information about the selected service request to the provider device.

16. The method of claim 15, wherein estimating the duration is based at least in part on an estimated additional time associated with at least one of the service provider performing a first aspect of the transport service at the service start location or the service provider performing a second aspect of the transport service at the service destination.

17. The method of claim 15, wherein estimating the duration for the service provider is based at least in part on an estimated travel time for the service provider to travel from the service destination of the service request to the provider-specified destination.

\* \* \* \* \*